(12) United States Patent
Gupta et al.

(10) Patent No.: US 11,398,085 B2
(45) Date of Patent: Jul. 26, 2022

(54) SYSTEMS, METHODS, AND MEDIA FOR DIRECTLY RECOVERING PLANAR SURFACES IN A SCENE USING STRUCTURED LIGHT

(71) Applicant: Wisconsin Alumni Research Foundation, Madison, WI (US)

(72) Inventors: Mohit Gupta, Madison, WI (US); Jongho Lee, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/945,449

(22) Filed: Jul. 31, 2020

(65) Prior Publication Data

US 2022/0036118 A1  Feb. 3, 2022

(51) Int. Cl.
*G06V 10/60* (2022.01)
*G06T 7/521* (2017.01)
*G06V 10/44* (2022.01)

(52) U.S. Cl.
CPC ............ *G06V 10/60* (2022.01); *G06T 7/521* (2017.01); *G06V 10/44* (2022.01)

(58) Field of Classification Search
CPC .... G06K 9/4661; G06K 9/4604; G06T 7/521; G06T 11/40; G05B 2219/33115
See application file for complete search history.

(56) References Cited

U.S. PATENT DOCUMENTS

| 10,282,857 | B1* | 5/2019 | Brailovskiy | ....... G01B 11/2536 |
| 2010/0135534 | A1* | 6/2010 | Weston | ................. G06T 7/0004 382/106 |
| 2017/0178354 | A1* | 6/2017 | Wendler | ............... H04N 13/243 |
| 2019/0033064 | A1* | 1/2019 | Becker | ................ H04N 13/239 |
| 2020/0105005 | A1* | 4/2020 | Grassinger | ............. G06T 7/521 |

OTHER PUBLICATIONS

Borrmann, D., et al. The 3d hough transform for plane detection in point clouds: A review and a new accumulator design. 3D Research 2(2), 3 (2011).

(Continued)

*Primary Examiner* — Nancy Bitar
(74) *Attorney, Agent, or Firm* — Quarles & Brady LLP

(57) ABSTRACT

In accordance with some embodiments, systems, methods and media for directly recovering planar surfaces in a scene using structured light are provided. In some embodiments, a system comprises: a light source; an image sensor; a processor programmed to: cause the light source to emit a pattern comprising a pattern feature with two line segments that intersect on an epipolar line; cause the image sensor to capture an image including the pattern; identify an image feature in the image, the image feature comprising two intersecting line segments that intersect at a point in the image that corresponds to the first epipolar line; estimate a plane hypothesis associated with the pattern feature based on properties of the pattern feature and properties of the image feature, the plane hypothesis associated with a set of parameters characterizing a plane; and identify a planar surface in the scene based on the plane hypothesis.

23 Claims, 16 Drawing Sheets
(14 of 16 Drawing Sheet(s) Filed in Color)

(56) References Cited

OTHER PUBLICATIONS

Harris et al., "A combined corner and edge detector," Alvey Vision Conference, vol. 15, pp. 147-151 (1988).
Inokuchi, S.: Range imaging system for 3-d object recognition. ICPR, 1984 pp. 806-808 (1984).
Lam et al., "Thinning Methodologies—A Comprehensive Survey," IEEE Transactions on Pattern Analysis and Machine Intelligence, vol. 14, No. 9, p. 869 (1992).
Sagawa, R., et al. Dense 3d reconstruction method using a single pattern for fast moving object. In: Proc. IEEE ICCV. pp. 1779-1786 (2009).
International Searching Authority. International Search Report and Written Opinion for application PCT/US2021/044165. dated Mar. 24, 2022. 9 pages.

\* cited by examiner

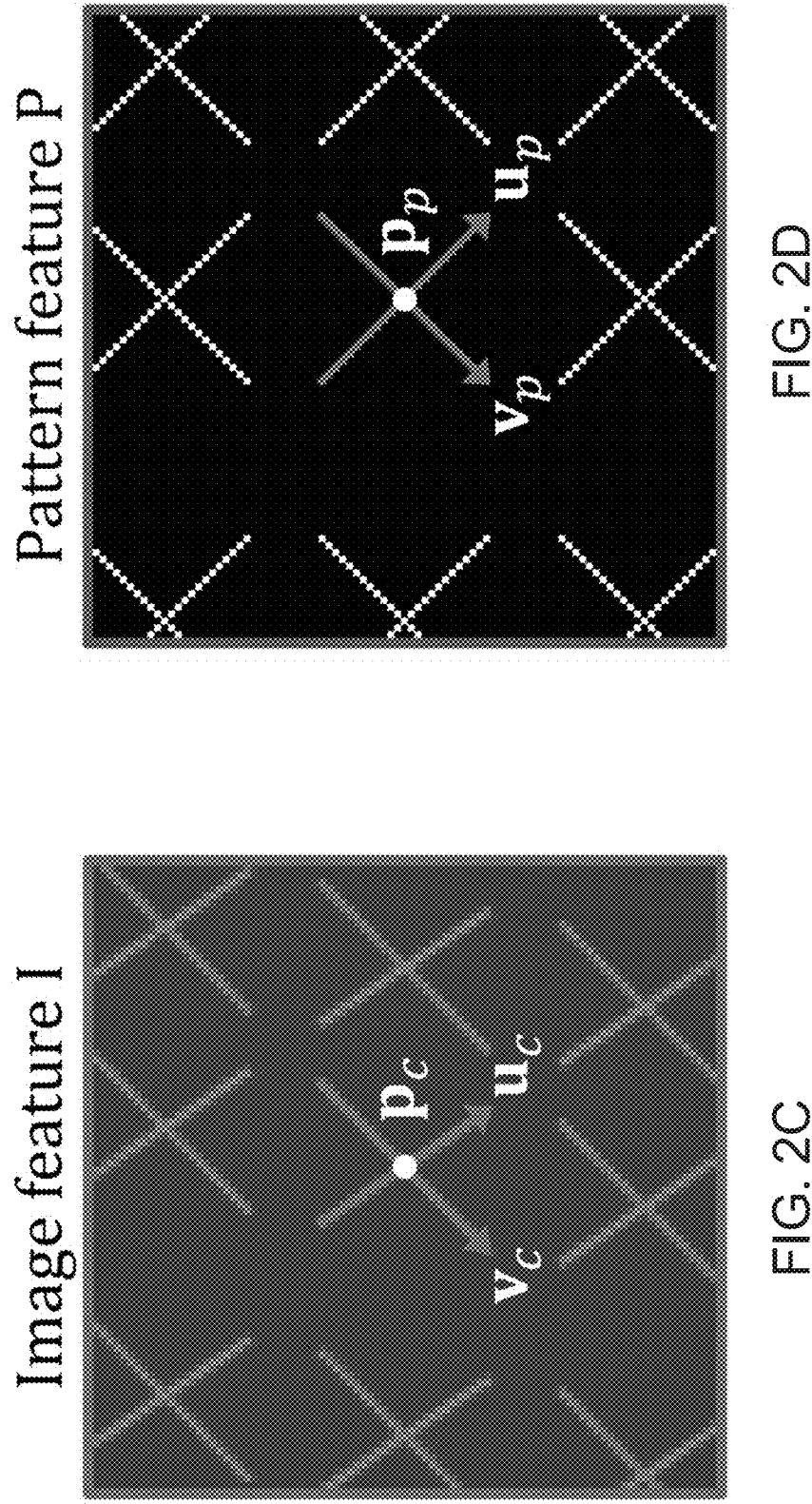

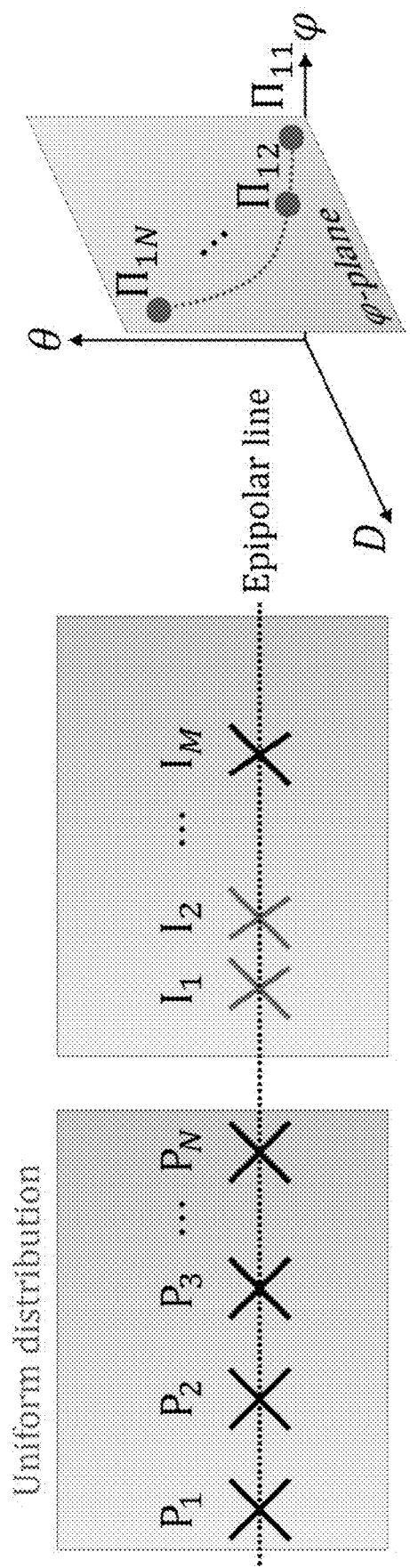
FIG. 4A1
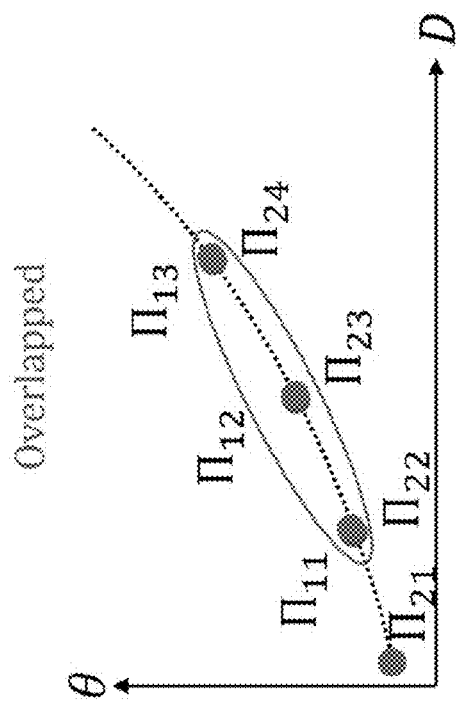
FIG. 4A2

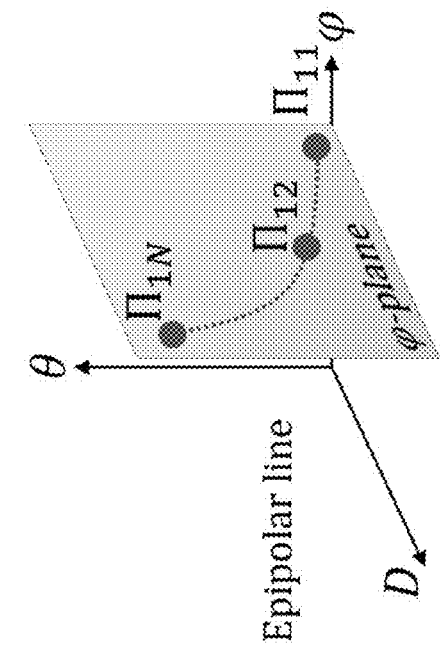
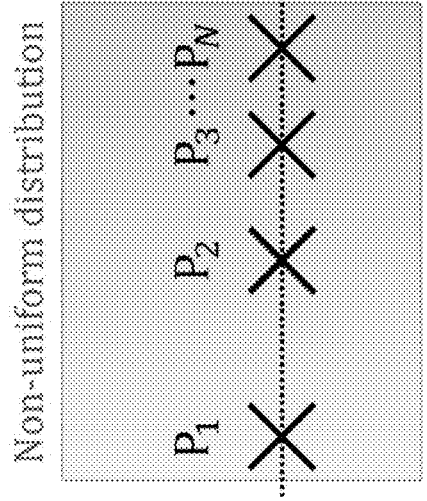
FIG. 4B1
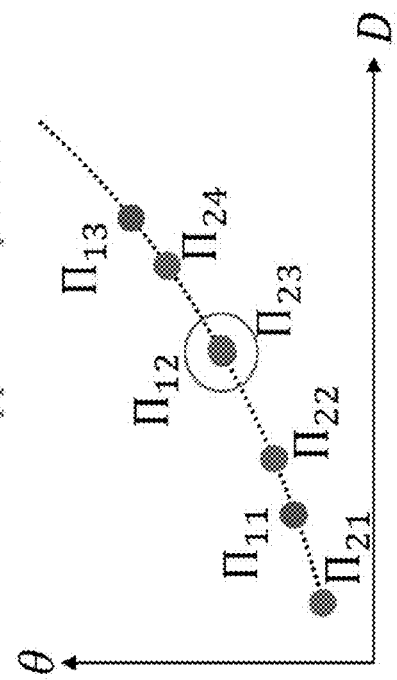
FIG. 4B2

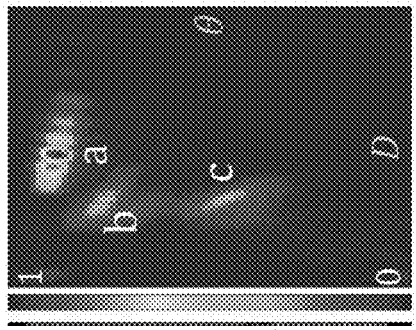
FIG. 8A
Pattern-projected scene
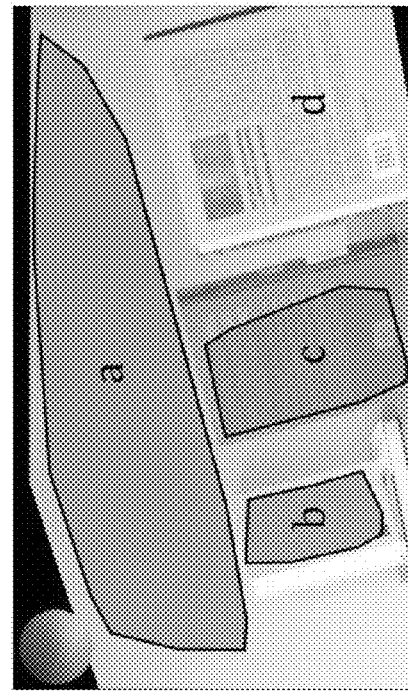
FIG. 8B
Π space
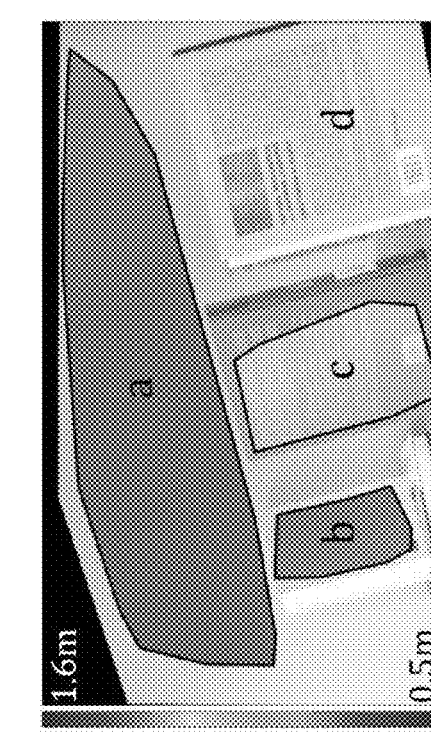
FIG. 8C
Predicted plane depth
FIG. 8D
Predicted plane normal

SYSTEMS, METHODS, AND MEDIA FOR DIRECTLY RECOVERING PLANAR SURFACES IN A SCENE USING STRUCTURED LIGHT

STATEMENT REGARDING FEDERALLY SPONSORED RESEARCH

This invention was made with government support under N00014-16-1-2995 awarded by the NAVY/ONR. The government has certain rights in the invention.

CROSS-REFERENCE TO RELATED APPLICATIONS

N/A

BACKGROUND

Recently 3D imaging has exploded in popularity for use in various applications. For example, robots equipped with 3D cameras have been used to drive cars, explore space, and manage factories. While some of these applications require high-resolution 3D scans of the surroundings, other tasks do not explicitly need dense 3D point clouds. Examples of such applications include autonomous navigation (e.g., in an indoor space or a city block), or an augmented reality (AR) system attempting to find surfaces in a room on which to place virtual objects. In such applications, a system may capture a relatively high definition point cloud, and then may attempt to determine features of the environment from the point cloud. This generally requires a large computation cost to find surfaces from the point cloud data, which may be relatively noisy.

Accordingly, new systems, methods, and media for directly recovering planar surfaces in a scene using structured light are desirable.

SUMMARY

In accordance with some embodiments of the disclosed subject matter, systems, methods, and media for directly recovering planar surfaces in a scene using structured light are provided.

In accordance with some embodiments of the disclosed subject matter, a system for recovering planes in a scene is provided, the system comprising: a light source; an image sensor comprising an array of pixels; at least one hardware processor that is programmed to: cause the light source to emit a two-dimensional light pattern toward the scene, wherein the two-dimensional light pattern comprises a pattern feature that is disposed on a first epipolar line, the pattern feature comprising two intersecting line segments that intersect at a point that is located on the first epipolar line; cause the image sensor to capture an image of the scene including at least a portion of the light pattern; identify an image feature in the image, the image feature comprising two intersecting line segments that intersect at a point in the image that corresponds to the first epipolar line; identify at least the pattern feature as potentially corresponding to the image feature based on the image feature and the pattern feature both being associated with the first epipolar line; estimate a plane hypothesis associated with the pattern feature based on properties of the pattern feature and properties of the image feature, wherein the plane hypothesis is associated with a set of parameters that characterize a plane; and identify a planar surface in the scene based on the plane hypothesis.

In some embodiments, the two-dimensional light pattern comprises a set of N pattern features $\{P_1, \ldots, P_N\}$, including the pattern feature, that are each disposed on the first epipolar line; and wherein the at least one hardware processor is further programmed to: identify the set of N pattern features as potentially corresponding to the image feature based on the image feature and the set of N pattern features all being associated with the first epipolar line; estimate a first set of N plane hypotheses each associated with a respective pattern feature of the set of N pattern features, each plane hypothesis of the first set of N plane hypotheses based on properties of the image feature and properties of the respective pattern feature, wherein each plane hypothesis of the first set of N plane hypotheses is associated with a set of parameters that characterize a plane; identify a second image feature in the image that is associated with the first epipolar line, the second image feature comprising two intersecting line segments that intersect at a point that corresponds to the first epipolar line; identify the set of N pattern features as potentially corresponding to the second image feature based on the second image feature and the set of N pattern features all being associated with the first epipolar line; estimate a second set of N plane hypotheses each associated with a respective pattern feature of the set of N pattern features, each plane hypothesis of the second set of N plane hypotheses based on properties of the second image feature and properties of the respective pattern feature, wherein each plane hypothesis of the second set of N plane hypotheses comprises a set of parameters that characterize a plane; and identify the planar surface in the scene based on a plane hypothesis that is a member of both the first set of N plane hypotheses and the second set of N plane hypotheses.

In some embodiments, N>2, and a distance along the first epipolar line between pattern feature $P_1$ and pattern feature $P_2$ is different than a distance along the first epipolar line between pattern feature $P_{N-1}$ and pattern feature $P_N$, such that the set of N pattern features $\{P_1, \ldots, P_N\}$ are non-uniformly spaced.

In some embodiments, the two-dimensional light pattern comprises a second set of N pattern features $\{P_{N+1}, \ldots, P_{2N}\}$ that are each disposed on a second epipolar line, and wherein a distance along the second epipolar line between pattern feature $P_{N1}$ and pattern feature $P_{N+2}$ is different than a distance along the second epipolar line between pattern feature $P_{2N-1}$ and pattern feature $P_{2N}$, and the distance along the second epipolar line between pattern feature $P_{N1}$ and pattern feature $P_{N+2}$ is different than a distance along the first epipolar line between pattern feature $P_1$ and pattern feature $P_2$, such that the second set of N pattern features $\{P_{N+1}, \ldots, P_{2N}\}$ are non-uniformly spaced and are spaced differently than the set of N pattern features $\{P_1, \ldots, P_N\}$.

In some embodiments, the at least one hardware processor is further programmed to determine that the image feature is associated with the first epipolar line based on a proximity between the point at which the two line segments intersect and the first epipolar line.

In some embodiments, the light source comprises a plurality of rows, and the image sensor comprises a second plurality of rows, and the light source and the image sensor are rectified such that each row of the plurality of rows shares an epipolar line with a row of the second plurality of rows.

In some embodiments, a first line segment of the pattern feature is angled in a range of 35° to 55° with respect to the first epipolar line, and the second line segment of the pattern feature is angled in a range of 125° to 145° with respect to the first epipolar line.

In some embodiments, the properties of the pattern feature comprise a first vector $u_p$ corresponding to a first line segment of the pattern feature, a second vector $v_p$ corresponding to a second line segment of the pattern feature, and coordinates $p_p$ of the point at which the first vector $u_p$ and the second vector $v_p$ intersect, and wherein the properties of the image feature comprise a third vector $u_c$ corresponding to a first line segment of the image feature, a fourth vector $v_c$ corresponding to a second line segment of the image feature, and coordinates $p_c$ of the point at which the third vector $u_c$ and the fourth vector $v_c$ intersect.

In some embodiments, the set of parameters associated with the plane hypothesis define a plane $\Pi$ and include a distance D corresponding to a shortest distance between an origin $c_c$ of a camera coordinate system to the plane $\Pi$, a polar angle $\theta$ between a plane normal vector n and a z axis extending through $c_c$ and a center of an image plane defined by the image sensor, and an azimuthal $\varphi$ between the plane normal vector n and an x axis extending along a horizontal direction of the image plane.

In some embodiments, the processor is further programmed to: determine the plane normal vector n using the relationship $$n = \frac{((p_p \times v_p) \times (p_c \times v_c)) \times ((p_p \times u_p) \times (p_c \times u_c))}{\|((p_p \times v_p) \times (p_c \times v_c)) \times ((p_p \times u_p) \times (p_c \times u_c))\|};$$

and determine the distance D using the relationship $$D = \frac{bn^T p_p}{p_{px} - p_{cx}} - n^T c_p,$$

where b is a distance between the origin $c_c$ of the camera coordinate system and an origin $c_p$ of a pattern coordinate system.

In some embodiments, the processor is further programmed to: cause the image sensor to capture a second image of the scene that does not include the light pattern; calculate a difference image based on a difference between the image and the second image; and identify the image feature in the image using the difference image.

In accordance with some embodiments of the disclosed subject matter, a method for recovering planes in a scene is provided, the method comprising: causing a light source to emit a two-dimensional light pattern toward the scene, wherein the two-dimensional light pattern comprises a pattern feature that is disposed on a first epipolar line, the pattern feature comprising two intersecting line segments that intersect at a point that is located on the first epipolar line; causing an image sensor to capture an image of the scene including at least a portion of the light pattern; identifying an image feature in the image, the image feature comprising two intersecting line segments that intersect at a point in the image that corresponds to the first epipolar line; identifying at least the pattern feature as potentially corresponding to the image feature based on the image feature and the pattern feature both being associated with the first epipolar line; estimating a plane hypothesis associated with the pattern feature based on properties of the pattern feature and properties of the image feature, wherein the plane hypothesis is associated with a set of parameters that characterize a plane; and identifying a planar surface in the scene based on the plane hypothesis.

In accordance with some embodiments of the disclosed subject matter, a non-transitory computer readable medium containing computer executable instructions that, when executed by a processor, cause the processor to perform a method for recovering planes in a scene is provided, the method comprising: causing a light source to emit a two-dimensional light pattern toward the scene, wherein the two-dimensional light pattern comprises a pattern feature that is disposed on a first epipolar line, the pattern feature comprising two intersecting line segments that intersect at a point that is located on the first epipolar line; causing an image sensor to capture an image of the scene including at least a portion of the light pattern; identifying an image feature in the image, the image feature comprising two intersecting line segments that intersect at a point in the image that corresponds to the first epipolar line; identifying at least the pattern feature as potentially corresponding to the image feature based on the image feature and the pattern feature both being associated with the first epipolar line; estimating a plane hypothesis associated with the pattern feature based on properties of the pattern feature and properties of the image feature, wherein the plane hypothesis is associated with a set of parameters that characterize a plane; and identifying a planar surface in the scene based on the plane hypothesis.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

The patent or application file contains at least one drawing executed in color. Copies of this patent or patent application publication with color drawing(s) will be provided by the Office upon request and payment of the necessary fee.

FIG. 2C shows an example representation of an image including a pattern feature in accordance with some embodiments of the disclosed subject matter.

FIG. 2D shows an example representation of a pattern including the pattern feature recorded in the image of FIG. 2C in accordance with some embodiments of the disclosed subject matter.

FIG. 4A1 shows an example of a uniformly distributed pattern of pattern features, corresponding imaged pattern features, and plane parameter loci in Π space for each pattern feature on the same epipolar line as imaged pattern feature $I_1$ in accordance with some embodiments of the disclosed subject matter.

FIG. 4A2 shows an example of overlapping loci in Π space for imaged pattern features $I_1$ and $I_2$ in accordance with some embodiments of the disclosed subject matter.

FIG. 4B1 shows an example of a non-uniformly distributed pattern of pattern features, corresponding imaged pattern features, and plane parameter loci in Π space for each pattern feature on the same epipolar line as imaged pattern feature $I_1$ in accordance with some embodiments of the disclosed subject matter.

FIG. 4B2 shows an example of loci in Π space for imaged pattern features $I_1$ and $I_2$ that only overlap at the true value of Π of a plane onto which both pattern features in accordance with some embodiments of the disclosed subject matter.

FIG. 8A shows an example of a scene onto which a pattern was projected using a projector implemented in accordance with some embodiments of the disclosed subject matter.

FIG. 8B shows examples of loci corresponding to candidate planes in Π space determined based on correspondence between pattern features in the scene and pattern features on the same epipolar line of the projector estimated in accordance with some embodiments of the disclosed subject matter.

FIG. 8C shows examples of estimated plane depths determined based on the loci of FIG. 8B in accordance with some embodiments of the disclosed subject matter.

FIG. 8D shows examples of estimated plane normals determined based on the loci of FIG. 8B in accordance with some embodiments of the disclosed subject matter.

DETAILED DESCRIPTION

Figure 1A:
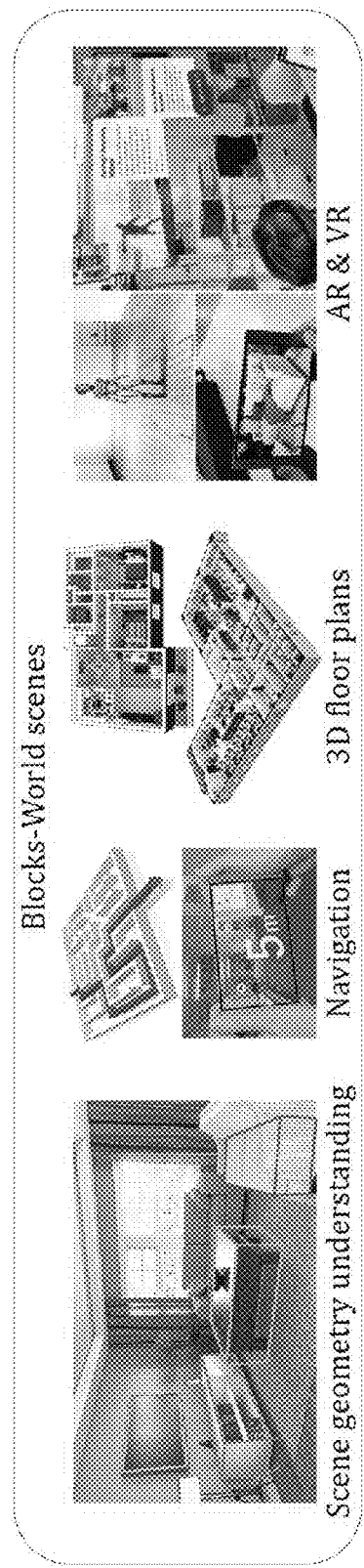
FIG. 1A shows an example of applications in which planes in a scene can be recovered in accordance with some embodiments of the disclosed subject matter.

In accordance with various embodiments, mechanisms (which can, for example, include systems, methods, and media) for directly recovering planar surfaces in a scene using structured light are provided.

In some embodiments of the subject matter disclosed herein, structured light (SL) systems can simultaneously recover planar surfaces in a scene and estimate depths of portions of the planar surface in the scene (e.g., as distances to various points in the scene corresponding to recovered planar surfaces) based on patterns of light detected in a single image of the scene captured as the patterns of light are projected toward the scene. The ability to image scenes in three dimensions (3D) and/or determine distances to scene points has recently been increasing in importance. As autonomous or semi-autonomous systems are beginning to drive cars, explore space, and manage factories based on depth information facilitated by 3D cameras and other sensor technologies. While some of applications require high-resolution 3D scans of the surroundings, several tasks do not explicitly need dense 3D point clouds. For example, a robot navigating an indoor space or a city block can plan a route based on the location of planar surfaces. As another example, augmented reality (AR) system can find surfaces in a living room for placing virtual objects based on the location of planar surfaces. For such applications, particularly in devices with limited computational budgets, it is often desirable to create compact, memory- and compute-efficient 3D scene representations. For example, as described below in connection with FIG. 1B, a conventional approach to representing piece-wise planar indoor scenes is to first capture 3D point cloud data with a depth camera or other depth sensor, and then estimate a piece-wise planar representation of the scene. This requires capturing relatively high-resolution 3D point cloud data, then extracting a much less data intensive planar representation of the scene at a relatively high computational cost. In some embodiments, mechanisms described herein can be used to directly recover compact geometric representations of a scene, without costs associated with capturing 3D point cloud data and estimating planar surfaces from the 3D point cloud data.

In some embodiments, mechanisms described herein can be used to directly recover dominant plane parameters for piece-wise planar scenes (sometimes referred to as blocks-world scenes) without creating 3D point clouds, which can facilitate fast, low-cost, and accurate reconstructions. In some embodiments, mechanisms described herein can be used to implement cameras (e.g., blocks-world cameras) that are based on a structured light system that includes a projector which projects a single pattern on a scene, and a camera to capture an image of the scene. In some embodiments, the pattern can include a sparse set of cross-shaped features (e.g., having two line-segments) which mechanisms described herein can map to cross-shaped features in the camera image via homographies induced by scene planes. In some embodiments, if correspondences between image and pattern features can be established, plane parameters can be estimated by measuring the deformation (change of angles of the two segments) between the pattern features. In some embodiments, using a pattern with multiple features on each epipolar line can provide sufficient feature density to accurately measure plane parameters, but can also lead to ambiguities. Additionally, as the feature density increases, the size of each feature may need to be reduced to accommodate the additional density, which can lead to difficulty accurately measuring deformation.

In general, it is challenging to find correct feature correspondences in a single-shot SL system without computationally intensive complex global reasoning. In some embodiments, mechanisms described herein can facilitate reconstruction while maintaining both relatively high feature density and relatively low computational complexity. In some embodiments, mechanisms described herein can utilize a geometric process that facilitates plane parameter estimation even with unknown correspondences.

In some embodiments, given an image feature, all the pattern features on the corresponding epipolar line can be candidates for matches. Each candidate pattern feature, along with the image feature, can be used to generate a plane hypothesis, and mechanisms described herein can use a voting procedure to select a planar parameter representing a plane onto which the image feature was projected. The plane hypothesis can be represented as a point in a 3D plane parameter space (e.g., as described below in connection with 4A2 and 4B2). Accordingly, in some embodiments, the mechanisms described herein can use a set of all the candidate pattern feature correspondences to represent a vote for a set of plane hypotheses, which can be referred to as the plane parameter locus. In some embodiments, if the pattern features are spaced non-uniformly on the epipolar line (e.g., as described below in connection with FIGS. 4B1 and 4B2), the plane parameter loci for multiple image features lying on the same scene plane (which is sometimes referred to as a world plane) can be expected to intersect at a unique location in the parameter space. Such an intersection point corresponds to the parameters of the world plane, and can be determined by relatively simple local-peak finding, without explicitly determining correspondences.

As described below in connection with FIGS. 1B to 6, in some embodiments, mechanisms described herein can use a feature pattern and a relatively fast process that can simultaneously recovers depth and normal maps of piece-wise planar scenes. Simulations and experiments are described below that show that implementations of mechanisms described herein can capture clean and clutter-free 3D models, for a wide range of challenging scenarios, including texture-poor scenes, and large lighting variations. The computational complexity of techniques described in connection with some embodiments of the disclosed subject matter can be up to an order-of-magnitude lower than conventional plane-fitting techniques, and can remain relatively constant regardless of the geometric complexity of the scene. This can facilitate real-time performance on high-resolution images, even with limited computing resources. In some embodiments, mechanisms described herein can be used in connection with capture of only one or two images, and can be implemented with simple and low-cost single-pattern projectors with a static mask. Additionally, the sparsity of the projected pattern can mitigate noise caused by interreflections, a challenging problem which is difficult to solve with dense patterns.

In some embodiments, mechanisms described herein can be used effectively to estimate planar information for piece-wise planar scenes, which can be useful in applications that can utilize compact 3D representations that include a small set of planes. For example, mechanisms described herein can be used to facilitate fast and robust in applications such as robotic navigation, indoor scene modeling, augmented reality.

FIG. 1A shows an example of applications in which planes in a scene can be recovered in accordance with some embodiments of the disclosed subject matter. As shown in FIG. 1A, many scenes include relatively large planar surfaces, which can be used to model at least macroscopic features of the scene. For example, a furnished room may include multiple pieces of furniture that can be modeled using planes to approximate the shapes of the furniture. In some embodiments, mechanisms described herein can be used to understand the geometry of a room for any suitable application, such as modeling floor plans, and determining the layout of a furnished room. As another example, many indoor spaces and outdoor spaces include planar surfaces that correspond to features of the environment, such as floors, ceilings, walls, doors, roads, sidewalks, etc. In some embodiments, mechanisms described herein can be used to plan a navigation route, and to find planar surfaces to use as a surface to use in an augmented reality scene.

Figure 1B:
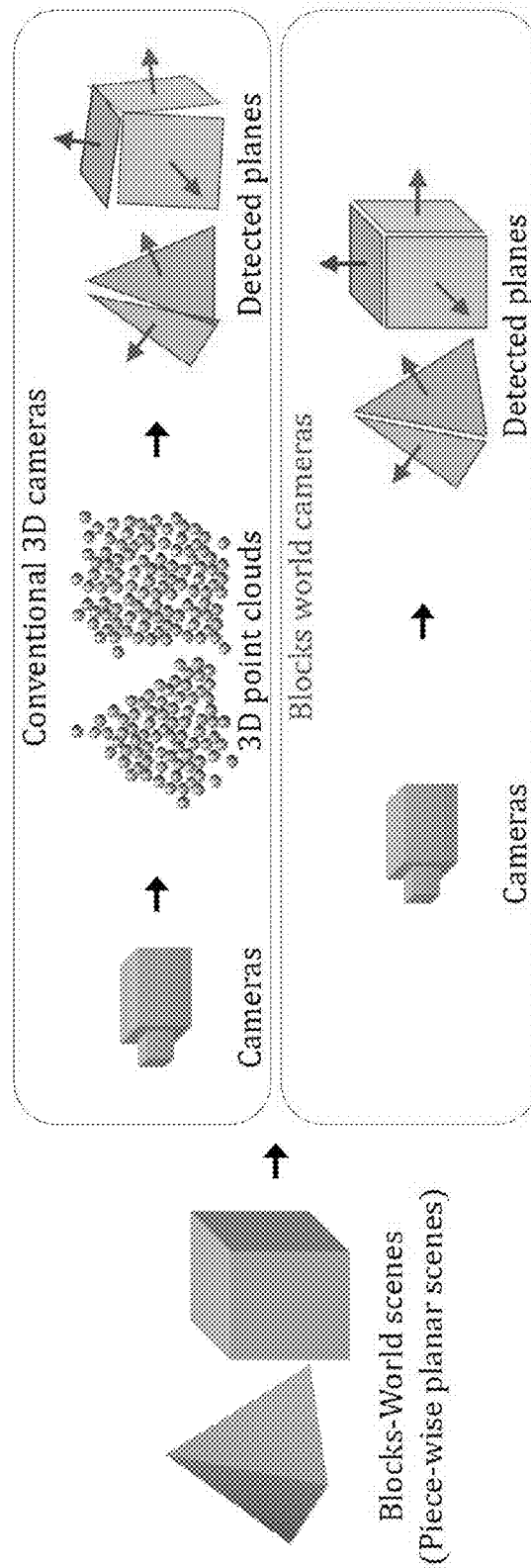
FIG. 1B shows an example comparing techniques for detecting planes in a scene using a point-cloud based system to techniques for detecting planes in accordance with some embodiments of the disclosed subject matter.

FIG. 1B shows an example comparing techniques for detecting planes in a scene using a point-cloud based system to techniques for detecting planes in accordance with some embodiments of the disclosed subject matter. As shown in FIG. 1B, a scene may include objects that can be modeled as piece-wise planar. Some conventional 3D imaging techniques use a depth camera(s) to generate 3D point data, and attempt to estimate planes from the 3D point cloud data. This can be a difficult and computationally intensive task, for example, because the 3D point cloud data may include noise and/or may have a resolution that does not capture relevant information at edges of objects which can contribute to difficulty in accurately estimating planar surfaces.

Figure 2B:
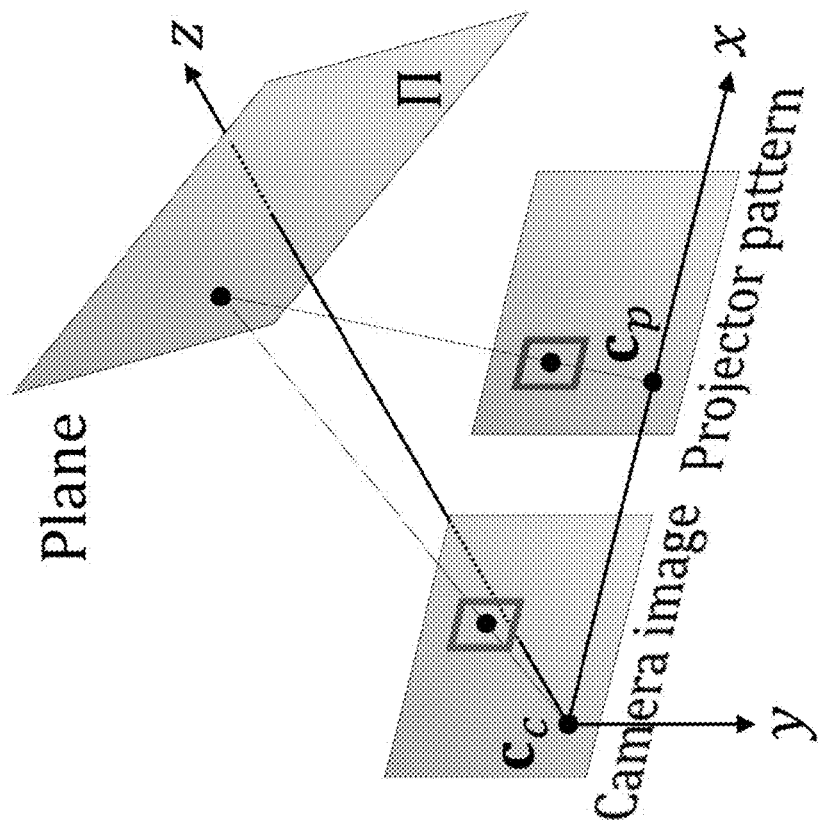
FIG. 2B shows an example representation of pattern and image correspondence in the structured light imaging system of FIG. 2A in accordance with some embodiments of the disclosed subject matter.
Figure 2A:
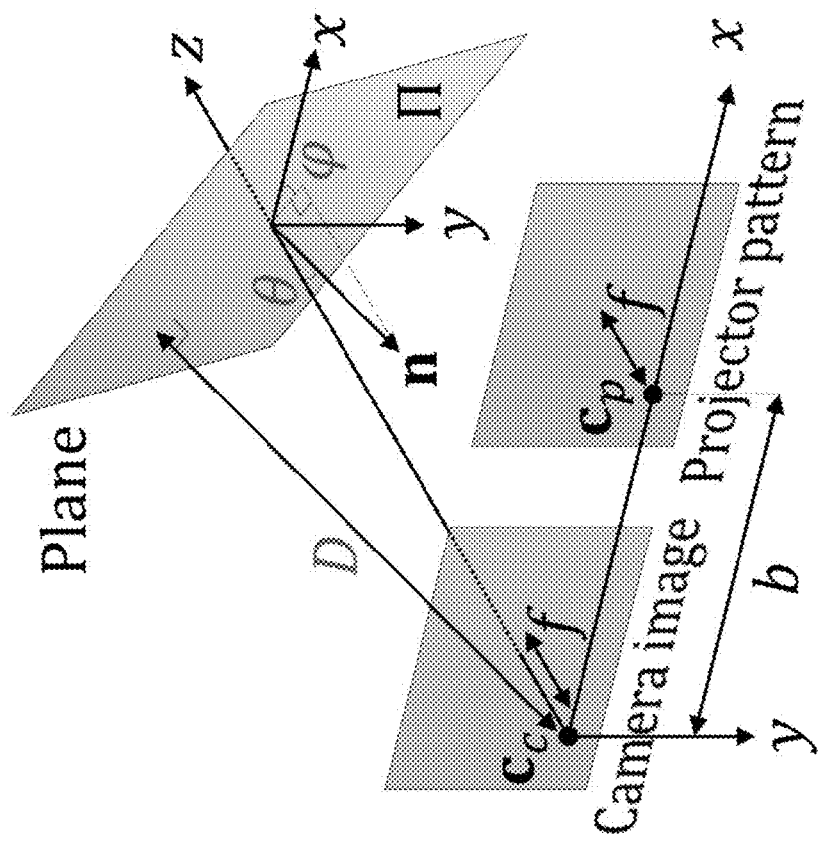
FIG. 2A shows an example representation of a structured light imaging system and a plane in a scene in accordance with some embodiments of the disclosed subject matter.

FIG. 2A shows an example representation of a structured light imaging system and a plane in a scene in accordance with some embodiments of the disclosed subject matter. As shown in FIG. 2A, a structured light system typically includes a project and a camera. A pinhole projection model can be assumed for both the camera and the projector. A camera coordinate system (CCS) can be defined that is centered at $c_c$ corresponding to the optical center of the camera. A projector coordinate systems (PCS) can be defined that is centered at $c_p$ corresponding to the optical center of the projector. In the system shown in FIG. 2A, $c_c$ and $c_p$ are separated by a projector-camera baseline b along the X axis. Note that this is merely an example, and structured light systems can be configured with the camera and projector separated along the y axis, or at an angle to the x and y axes which can require calibration of the projector-camera setup and rectifying the captured image. A world coordinate system (WCS) can be defined based on the CCS with the WCS origin centered at $c_c$, such that $c_c=[0, 0, 0]^T$ and $c_p=[b, 0, 0]^T$.

Without loss of generality, both the camera and the projector can be assumed to have the same focal length f, which can be interpreted as the image planes of both the camera and projector being located at a distance f from the respective optical centers along the Z-axis. For simplicity, a rectified system can be assumed such that the epipolar lines are along the rows of the camera image and projector pattern. These assumptions (same focal length, rectified setup) are merely an example, and can be relaxed in practice by calibrating the projector-camera setup and rectifying the captured images to correspond to the configuration shown in FIG. 2A.

In the WCS (and in the CCS in the example shown in FIG. 2A), a plane in 3D space can be characterized by three parameters: $\Pi=\{D, \theta, \varphi\}$, where $\Pi$ is a plane in 3D space, $D \in [0, \infty)$ is the perpendicular (shortest) distance from the origin ($c_c$) to plane $\Pi$, $$\theta \in \left[0, \frac{\pi}{2}\right)$$

is the polar angle between the plane normal and the—(i.e., along the Z axis toward the CCS origin $c_c$), and $\varphi \in [-\pi, \pi)$ is the azimuthal angle between the plane normal and the X axis (measured clockwise), as shown in FIG. 2A. In the example shown in FIG. 2A, the surface normal n of the plane $\Pi$ can be represented by the relationship: $n=[\sin \theta \cos \varphi, \sin \theta \sin \varphi, \cos \theta]^T$. As described below in connection with EQ. (3), the surface normal n can be directly estimated, and the preceding relationship can be used to estimate plane parameters $\theta$ and $\varphi$ from the surface normal n.

FIG. 2B shows an example representation of pattern and image correspondence in the structured light imaging system of FIG. 2A in accordance with some embodiments of the disclosed subject matter. As shown in FIG. 2B, there is a correspondence between a pattern feature (represented by the box in the projector pattern) and an image feature corresponding to the pattern feature (represented by the box in the camera image). In many conventional structured light systems, the system can attempt to determine the correspondence between pattern features and image features, and can use the correspondence to estimate the distance to a point in the scene by triangulation. In some embodiments, mechanisms described herein can use information about potential correspondence between pattern features and camera features to attempt to directly determine parameters that can characterize a plane $\Pi$ onto which the pattern feature was projected.

FIGS. 2C and 2D show example representations of an image including a pattern feature and a pattern including the pattern feature recorded in the image of FIG. 2C in accordance with some embodiments of the disclosed subject matter. As shown in FIGS. 2C and 2D, projection onto a plane that has a normal that is not precisely aligned with the z axis can result in deformation of the pattern in the image feature.

FIGS. 3A to 3D show examples of a first line segment corresponding to a portion of a pattern feature projected onto a plane of a scene and recorded in an image, a second line segment corresponding to another portion of the pattern feature recorded in the image, both the first and second line segments together in accordance with some embodiments of the disclosed subject matter, and a line segment in a pattern corresponding to a pattern feature that produces degenerate solutions due to alignment between the line segment and epipolar lines. In general, structured light systems can be broadly classified into two categories. Multi-shot techniques such as line striping, binary Gray coding, and sinusoid phase-shifting involve projecting multiple patterns onto a scene for which depth information is to be estimated, and capturing an image of each pattern. These techniques can be used to generate high depth-precision 3D point cloud data, but are generally not suitable for dynamic scenes due to shifts that may occur between different image captures. Single-shot techniques involve projecting only a single pattern, which makes single-shot techniques more suitable for generating depth information when there is scene and/or camera motion. Additionally, single shot techniques can be typically be implemented with simple and low-cost single-pattern projectors (e.g., using a static mask or a diffractive optical element), instead of relying on a full projector that is configured to dynamically change the projected patterns.

In some embodiments, mechanisms described herein can be used to implement a single-shot technique that can simultaneously estimate both depth and surface normals of piece-wise planar scenes with only a single projected pattern. Mechanisms described herein can be implemented using cameras that have relatively low complexity, both computationally (e.g., using a relatively simple, low-cost algorithms) and for hardware (e.g., using a single-shot projection).

For a portion of a scene that is planar (e.g., in a scene that can be characterized as a piecewise planar scene), a pair of corresponding patches in the projected pattern and the captured images are related via a homography (assuming the patches lie on a single plane). The homography includes sufficient information to uniquely recover the parameters of the 3D scene plane that induces the homography. Additionally, the homography preserves straight lines and their intersections. For example, a pair of intersecting lines projected on the scene gets maps to a pair of intersecting lines in the image.

A pattern with a sparse set of features (e.g., a small fraction of the projector pixels are on) can facilitate robust and relatively fast correspondence matching. A sparse pattern can also potentially reduce source power requirements, for example, via the use of diffractive optical elements to implement the pattern. Additionally, a sparse pattern can mitigate effects caused by multi-path interference, which can be a source of significant error in SL imaging with dense patterns. However, there is a trade-off between the foregoing properties of sparse patterns and resolution. A sparse single-shot pattern can generally achieve only sparse 3D reconstructions in general scenes (e.g., scenes that are not predominantly piecewise planar). In some embodiments, mechanisms described herein can be used to recover scene geometry for piece-wise planar scenes with a relatively small number of dominant planes, even with sparse patterns.

In some embodiments, a pattern that includes a sparse set of identical features distributed spatially can be used to facilitate single-shot SL imaging that is robust and relatively fast, and that is robust to multi-path interference. In some embodiments, mechanisms described herein can be implemented using a pattern that includes cross-shaped features that include two intersecting line-segments. As shown in FIG. 2D, in some embodiments, the features can include line segments that make angles of 45° and 135° with the epipolar line (e.g., in the rectified system described in connection with FIG. 2A, the epipolar lines are along the rows of the camera image and the projector pattern). Additional details related to choice of line segment angles can be found in Section 5 of Appendix A, which has been incorporated herein by reference.

Such cross-shaped features can facilitate robust localization and efficient plane parameter estimation with computationally light-weight algorithms. Note that the angles are merely examples, and line segments disposed at other angles can be used, however, other combinations of angles may cause a decrease in certain performance characteristics. For example, deviating too far from the combination of 45° and 135° can make it impossible to determine plane parameters using only a single pattern projection. For example, if one line segment were disposed at 90°, regardless of the angle of the other line segment, there would be ambiguity in a range of image feature angles $\phi_c$ with respect to pattern feature angles $\phi_p$. In such an example, certain planes in the scene can cause the pattern to change orientation in a way that causes ambiguity between the two line segments making it difficult to differentiate between the two line segments without additional information. In a particular example, such additional information can be provided by differentiating the two line segments in some way (e.g., using different colors, using different line widths, adding embellishments to one or more line segments such as arrowheads, etc.). In another particular example, such additional information can be provided by capturing multiple images with different patterns. However, utilizing the additional information comes at a cost (e.g., more computational complexity is required to incorporate the additional information). In some embodiments, the pattern features can include a first line segment that makes an angle in a range of 1° to 90° with the epipolar line, and a second line segment that makes an angle in a range of 90° to 179° with the epipolar line, so long as the angles are not the same. In some embodiments, the pattern features can include a first line segment that makes an angle in a range of 10° to 80° with the epipolar line, and a second line segment that makes an angle in a range of 100° to 170° with the epipolar line. In some embodiments, the pattern features can include a first line segment that makes an angle in a range of 20° to 70° with the epipolar line, and a second line segment that makes an angle in a range of 110° to 160° with the epipolar line. In some embodiments, the pattern features can include a first line segment that makes an angle in a range of 30° to 60° with the epipolar line, and a second line segment that makes an angle in a range of 120° to 150° with the epipolar line. In some embodiments, the pattern features can include a first line segment that makes an angle in a range of 35° to 55° with the epipolar line, and a second line segment that makes an angle in a range of 125° to 145° with the epipolar line. In some embodiments, the pattern features can include a first line segment that makes an angle in a range of 40° to 50° with the epipolar line, and a second line segment that makes an angle in a range of 130° to 140° with the epipolar line.

Figure 3B:
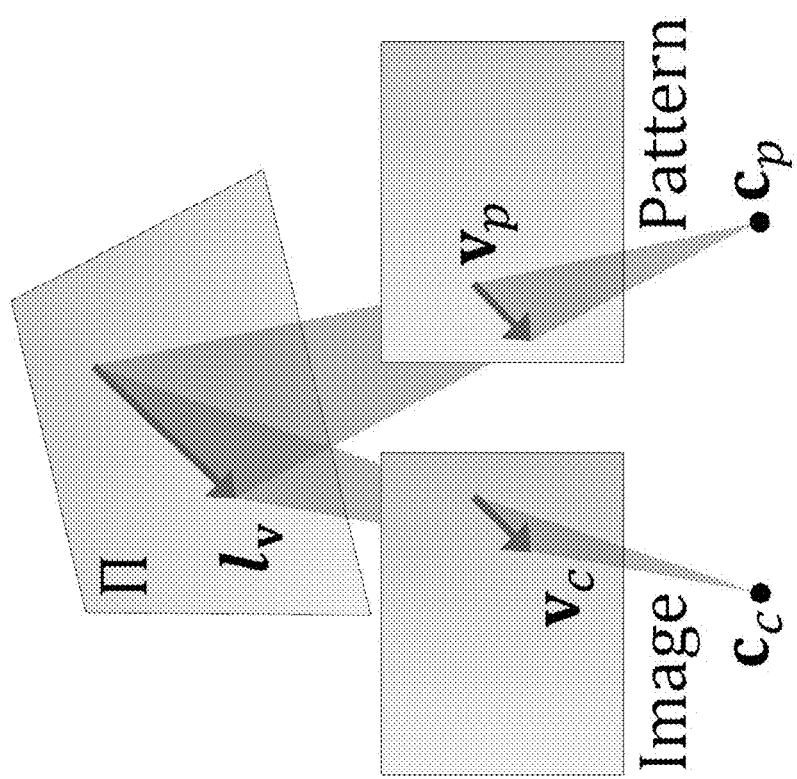
FIG. 3B shows an example of a second line segment corresponding to another portion of the pattern feature projected onto the plane of the scene and recorded in an image in accordance with some embodiments of the disclosed subject matter.
Figure 3A:
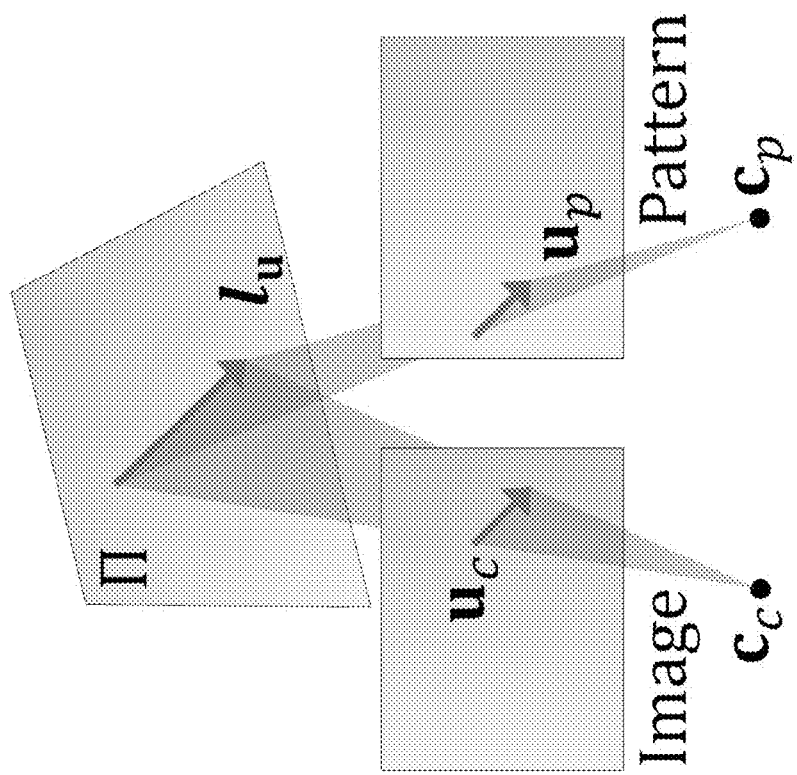
FIG. 3A shows an example of a first line segment corresponding to a portion of a pattern feature projected onto a plane of a scene and recorded in an image in accordance with some embodiments of the disclosed subject matter.
Figure 3D:
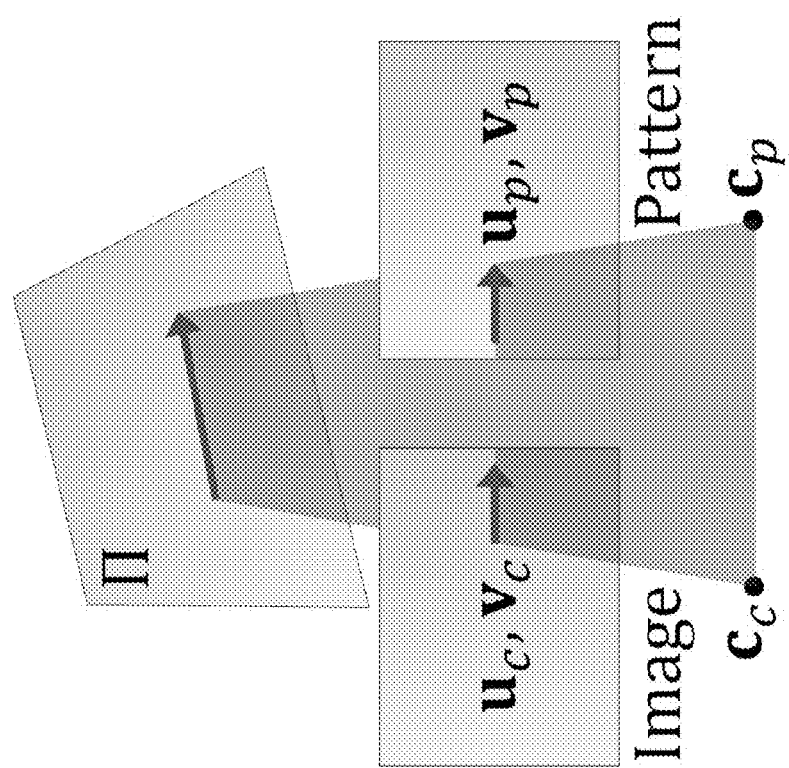
FIG. 3D shows an example of a line segment in a pattern corresponding to a pattern feature that produces degenerate solutions due to alignment between the line segment and epipolar lines.
Figure 3C:
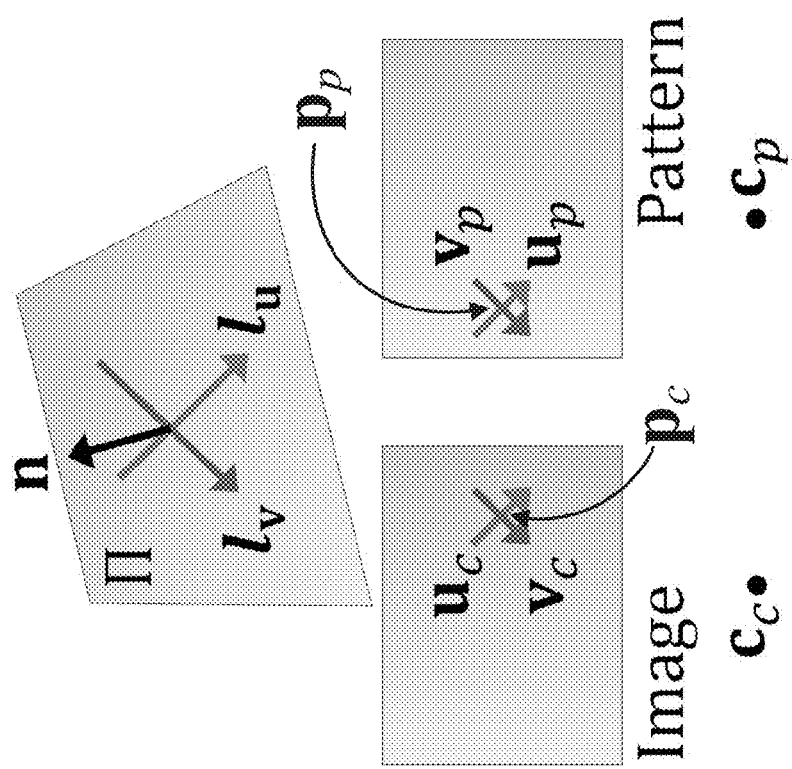
FIG. 3C shows an example of both the first and second line segments corresponding to the pattern feature projected onto the plane of the scene and recorded in an image in accordance with some embodiments of the disclosed subject matter.

As shown in FIGS. 3A and 3B, a pattern feature P can be described by the relationship P={$u_p$, $v_p$, $p_p$}, where $v_p$ and $u_p$ are two line vectors and $p_p$ is the intersection point of $v_p$ and $u_p$ as shown in FIG. 3C. Correspondingly, an image feature I can be described by I={$u_c$, $v_c$, $p_c$}, where $v_c$ and $u_c$ are line vectors corresponding to $v_p$ and $u_p$, respectively, and $p_c$ is the intersection point of $v_c$ and $u_c$. Additionally, in the following description it is assumed that a projected feature P lies within a single scene plane Π, and that the feature is completely visible to the camera.

The elements in P and I can be defined in the coordinate system of the projector and camera (i.e., PCS and CCS, respectively). For example, for the pattern feature P={$u_p$, $v_p$, $p_p$}, the elements can be defined as follows:

$$u_p=[u_{px},u_y,0]_T, v_p=[v_{px},v_y,0]^T, p_p=[p_{px},p_y,f]^T. \quad (1)$$

Similarly, for the corresponding image feature I={$u_c$, $v_c$, $p_c$}, the elements can be defined as follows:

$$u_c=[u_{cx},u_y,0]^T, v_c=[v_{pc},v_y,0]_T, p_c=[p_{cx},p_y,f]^T \quad (2)$$

If pairs of corresponding P and I can be accurately identified such that the correspondence between pattern feature and image feature is known, the plane parameters can be recovered analytically by basic geometry, as shown in FIGS. 3A to 3C. For example, each cross-shaped feature correspondence can provide two line correspondences {$u_c$, $u_p$} and {$v_c$, $v_p$}, which can be triangulated to estimate two 3D line vectors $I_u$ and $I_v$, respectively. The plane Π can be completely defined by these two 3D lines, and can be estimated from the estimates of $I_u$ and $I_v$. For example, the surface normal n of Π can be estimated using the following relationship:

$$n = \frac{((p_p \times v_p) \times (p_c \times v_c)) \times ((p_p \times u_p) \times (p_c \times u_c))}{\|((p_p \times v_p) \times (p_c \times v_c)) \times ((p_p \times u_p) \times (p_c \times u_c))\|}. \quad (3)$$

Note that elements {$u_p$, $v_p$, $p_p$} which can represent the pattern feature in the PCS can be used in EQ. (3) without converting the features into the CCS or WCS. As another example, the shortest distance D from $c_c$ to Π can be estimated using the following relationship:

$$D = \frac{bn^T p_p}{p_{px} - p_{cx}} - n^T c_p \quad (4)$$

As yet another example, with values estimated for n and D, the depth d for $p_c$ can be estimated using the following relationship:

$$d = -f\frac{D}{n^T p_c} \text{ or } d = -f\frac{n^T c_p + D}{n^T p_p}. \quad (5)$$

Additional details related to the derivation of EQS. (3) to (5) can be found in Section 1 of Appendix A, which is hereby incorporated herein by reference in its entirety.

Note that if line correspondences {$u_c$, $u_p$} or {$v_c$, $v_p$} are collinear with epipolar lines it can cause a degenerate solution, as shown in FIG. 3D. In some embodiments, degenerate solutions can be avoided by selecting pattern features with line segments that are not aligned with the epipolar lines.

FIG. 4A1 shows an example of a uniformly distributed pattern of pattern features, corresponding imaged pattern features, plane parameter loci in Π space for each pattern feature on the same epipolar line as imaged pattern feature $I_1$ in accordance with some embodiments of the disclosed subject matter, and FIG. 4A2 shows an example of overlapping loci in Π space for imaged pattern features $I_1$ and $I_2$ in accordance with some embodiments of the disclosed subject matter. FIG. 4B1 shows an example of a non-uniformly distributed pattern of pattern features, corresponding imaged pattern features, and plane parameter loci in Π space for each pattern feature on the same epipolar line as imaged pattern feature $I_1$ in accordance with some embodiments of the disclosed subject matter, and FIG. 4B2 shows an example of loci in Π space for imaged pattern features $I_1$ and $I_2$ that only overlap at the true value of Π of a plane onto which both pattern features in accordance with some embodiments of the disclosed subject matter.

As described above in connection with FIGS. 3A to 3C, if the feature correspondences are known, the plane parameters can be estimated using EQS. (3) and (4). However, if the same pattern feature is repeatedly used throughout the pattern it can be difficult to uniquely determine feature correspondences. In some embodiments, correspondences can be determined by placing only a single feature on each epipolar line of the pattern. If the epipolar lines are aligned with rows of the camera image sensor and pattern projector (e.g., as is the case for the rectified system described above in connection with FIG. 2A), correspondences can be accurately estimated if each row includes only a single feature. In such embodiments, for each image feature, the correspondence can be computed trivially because $p_p$ is a function of camera row. However, using only a single pattern feature per row limits the maximum number of pattern features to the number of rows of the pattern and/or image sensor, which can reduce the likelihood that each scene plane will be illuminated by a feature. This can be further limited with the cross-shaped features described above in connection with FIGS. 2D and 3A to 3C since the features span multiple rows, which may require placing pattern features on only a subset of epipolar lines to avoid collisions.

In some embodiments, a pattern having multiple pattern features on each epipolar line increases the density of pattern features, which can increase the likelihood of each scene plane being illuminated by a feature. While this approach can increase the feature density, such a pattern includes multiple identical features on each epipolar line, leading to ambiguities when attempting to determine correspondence. This can make it difficult to determine accurate scene correspondences without additional information and/or without using complex global reasoning techniques which often require computationally intensive optimization. This appears to present a trade-off between accurately determining scene correspondence with relatively low computational cost and identifying the planes in a scene.

In some embodiments, mechanisms described herein can at least partially avoid this apparent trade-off by estimating plane parameters without explicitly computing correspondences between image features and pattern features. As shown in FIGS. 4A1 and 4B1, a set of pattern features on one epipolar line of a projected pattern can be defined as $\{P_1, \ldots, P_N\}$. At least a subset of these features are mapped to the camera image, resulting in a set of image features which can be defined as $\{I_1, \ldots, I_M\}$ (M≤N).

In the example of FIG. 4A1, because all the N pattern features $\{P_1, \ldots, P_N\}$ are identical, each of the pattern features is a candidate matching feature for image feature $I_1$. As described above in connection with EQS. (3) and (4), each candidate pattern feature can be used to estimate a plane hypothesis $\Pi=\{D, \theta, \varphi\}$ by triangulating that feature with the image feature $I_1$. Accordingly, the set of all candidate pattern features $\{P_1, \ldots, P_N\}$ can be used to create a set of plane hypotheses $\Lambda_1=\{\Pi_{11}, \ldots, \Pi_{1N}\}$, where $\Pi_{1N}$ (n∈{1, . . . , N}) is the plane parameter computed from $I_1$ and $P_n$. Each plane hypothesis can be represented as a point in a 3D plane parameter space (which is sometimes referred to herein as Π space), as shown in the right-most portion of FIGS. 4A1 and 4B1. The set of plane hypotheses $\Lambda_1=\{\Pi_{11}, \ldots, \Pi_{1N}\}$ can define a plane parameter locus in the Π space. Similarly, another plane parameter locus $\Lambda_2=\{\Pi_{21}, \ldots, \Pi_{2N}\}$ can be defined by pairing $I_2$ and $\{P_1, \ldots, P_N\}$, and so on for each image feature $\{I_1, \ldots, I_M\}$.

If $I_1$ and $I_2$ correspond to scene points on the same scene plane, then the two loci $\Lambda_1$ and $\Lambda_2$ must intersect. If the two loci intersect at a unique location $\hat{\Pi}$ in the parameter space, then $\hat{\Pi}$ represents the parameters of the common scene plane.

Figure 7A:
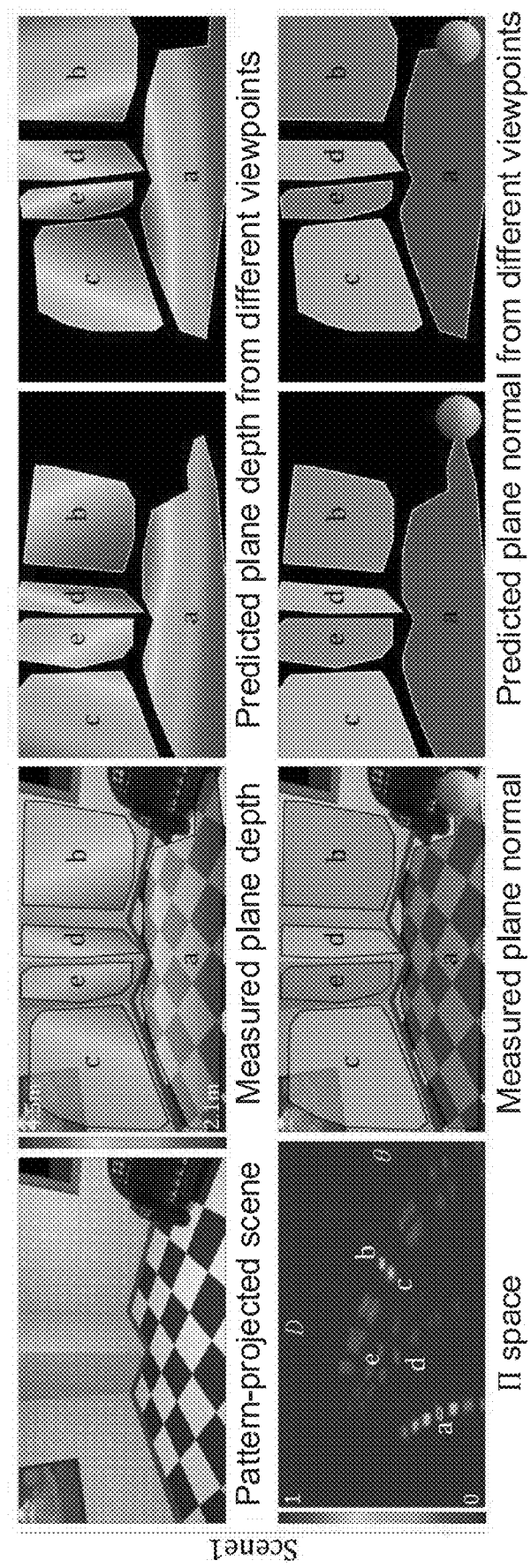
FIG. 7A shows an example of a simulated scene onto which a pattern was projected, loci corresponding to candidate planes in Π space, measured plane depths, measured plane normal, and estimated depths and plane normal recovered in accordance with some embodiments of the disclosed subject matter.
Figure 7B:
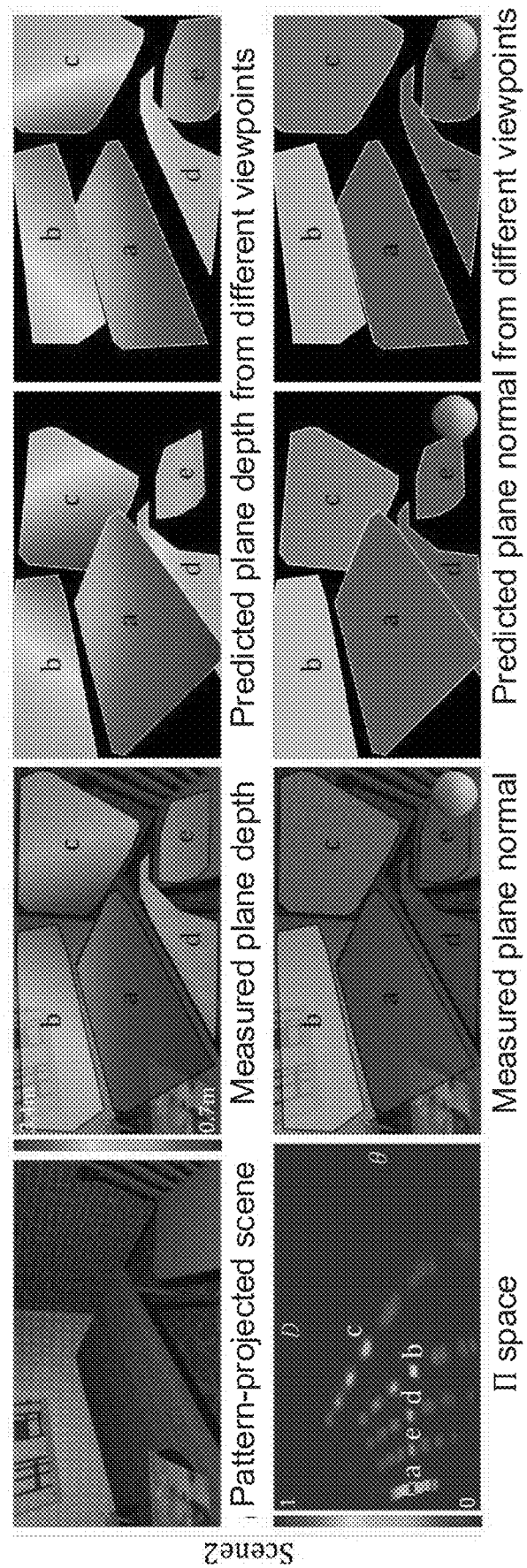
FIG. 7B shows an example of another simulated scene onto which a pattern was projected, loci corresponding to candidate planes in Π space, measured plane depths, measured plane normal, and estimated plane depths and plane normal recovered in accordance with some embodiments of the disclosed subject matter.

This intersection between loci in Π space can be leveraged in a voting-based approach for plane estimation that does not require explicit correspondence estimation, and that has a relatively low computational cost. In some embodiments, mechanisms described herein can estimate a plane parameter locus $\Lambda_i$ (1≤i≤M) for each detected image feature as described above. The locus can be used to represent votes for candidate planes cast in connection with a particular feature. In some embodiments, mechanisms described herein can collect parameter loci for all the detected image features, and a Π space with loci from all the image features plotted can be considered a likelihood distribution of scene planes, given the image features. FIGS. 7A and 7B show examples of Π space for two piecewise planar scenes. In some embodiments, mechanisms described herein can estimate plane parameters of dominant scene planes by identifying dominant local peaks in Π space. For a given local peak, mechanisms described herein associate all the image features with a plane parameter locus that included a candidate plane corresponding to the peak with the plane corresponding to the peak. Described in a voting-based context, each image feature with a plane parameter locus that included the peak can be described as having voted for the peak. In some embodiments, for such image features, depth and surface normal values can be computed by plane-ray intersection as described above in connection with EQS. (3) to (5).

Although this approach shares some similarities with conventional Hough transform-based plane estimation, there are some key differences. For example, in conventional Hough transform-based plane estimation, planes are estimated from 3D points with each 3D point voting for all candidate planes that pass through it. By contrast, the voting-based approach described above uses 2D image features to directly vote for candidate planes, avoiding the potentially expensive point cloud generation. As another example, in conventional Hough transform-based plane estimation, each 3D point votes for a dense set (i.e., a 2D set) of potential planes. When considered in connection with a large number of 3D points in a point cloud, this can result in large computational and memory costs. In the voting-based approach described above, a sparse set of features is used, and each image feature votes for a small, discrete set of candidate planes (e.g., fewer than 10 candidate planes were used for each image feature in the simulations and experiments described below in connection with FIGS. 7A to 10B). This results in considerably lower computation costs. For example, mechanisms described herein can estimate planes in a scene with a computational costs that is up to 2 orders of magnitude (in terms of the number of data points needed to estimate scene planes) lower than the cost of conventional Hough transform-based plane estimation. Additionally, the savings increase as the number of dominant planes in the scene decreases.

The description of the voting-based approach above assumes that plane parameter loci for different image features corresponding to the same world plane intersect in a unique location. If, for example, the loci for all the features on a camera epipolar line overlap at several locations, it is not possible to identify unique plane parameters without additional information. For example, as shown in FIG. 4A2, if the loci for multiple image features produce multiple equal magnitude peaks there is still ambiguity about the plane parameters of a plane on which the image features all lie. If the loci for multiple image features produce a single peak, this ambiguity is resolved. Therefore, in order for the voting-based approach described above to be useful in general scenes, the pattern must be evaluated to determine whether the foregoing assumption is valid.

There are two geometric properties of plane parameter loci that can be useful in determining whether the foregoing assumption that loci intersect at a unique location is valid. For example, a first property of a plane parameter locus $\Lambda_i$ ($1 \leq i \leq M$) that is based on pairing an image feature and a set of pattern features on the same epipolar line is that the locus always lies on a plane parallel to the $\varphi=0$ (azimuth angle) plane in the parameter space. Additional details related to the derivation of this property can be found in Section 3 of Appendix A, which has been incorporated herein by reference in its entirety.

As another example, a second property of a particular plane parameter locus $\Lambda_i$ ($1 \leq i \leq M$) is that the locations of elements in $\Lambda_i$ are a function only of a set of relative distances $D_\mu$. For example, a plane parameter locus $\Lambda_m$ can be defined as $\Lambda_m = \{\Pi_{m1}, \ldots, \Pi_{mN}\}$ which is the parameter locus created by an image feature $I_m$ and pattern features $\{P_1, \ldots, P_N\}$. If $P_\mu$ ($\mu \in \{1, \ldots, N\}$) is the set of true corresponding pattern feature of $I_m$, and $d_{\mu n}$ is the distance between pattern features $P_\mu$ and $P_n$ on the pattern epipolar line, the locations of the elements of $\Lambda_m$ are a function only of the set $D_\mu = \{_{\mu n} | n \in \{1, \ldots, N\}\}$ of relative distances between the true and candidate pattern features. Additional details related to the derivation of this property can be found in Section 3 of Appendix A, which has been incorporated herein by reference in its entirety.

The first property implies that it is possible to recover the azimuth angle of the plane normal from a single parameter locus without computing correspondences or determining a peak location in $\Pi$ space (e.g., without performing voting). As shown in FIGS. 4A1 and 4B1, which show that each candidate plane parameter $\Pi_{1n}$ in locus $\Lambda_1$ lie on a plane parallel to $\varphi=0$. Since every parameter locus is parallel to the $\varphi=0$ plane ($\varphi=0$ is constant across the locus), parameter loci can be represented in 2D D/$\theta$ space, as shown in FIGS. 4A2 and 4B2. Note that full 3D $\Pi$ space is necessary when differentiating between planes with the same D and $\theta$, but different $\varphi$.

The second property implies that if the pattern features are uniformly spaced on the epipolar line, the resulting loci will overlap significantly, as shown in FIG. 4A2. Note that in an example in which the pattern has two pattern features per epipolar line, if there are two image features a unique overlap between the two loci can be expected. However, if there is only 1 image feature on the epipolar line (e.g., if the scene geometry inhibits imaging of the other pattern feature), then there is only a single locus causing ambiguity. This is because of the following: for a uniformly spaced pattern (e.g., as shown in FIG. 4A1), the set of relative distances $D_\mu$ for two distinct pattern features can be expected to share several common values. Since the elements of the parameter loci of the corresponding image features are determined solely by the set of relative distances, the loci can also be expected to share common locations. Note that this is not a degenerate case; for uniformly spaced patterns, regardless of the scene, the loci can be expected to always have large overlaps, making it impossible to find unique intersections.

In light of the ambiguity that can be caused by evenly spaced pattern features, in some embodiments, mechanisms described herein can utilize a pattern that includes features that are non-uniformly spaced across each epipolar line. An example of a portion of a pattern with non-uniform spacing is shown in FIG. 4B1, and is present in FIGS. 7A, 7B, 8A, and 9A. In FIG. 4B1, N pattern features $\{P_1, \ldots, P_N\}$ are non-uniformly distributed on an epipolar line, and M ($M \leq N$) of the pattern features are included in an image as image features $\{I_1, \ldots, I_M\}$. For patterns having unequal spacing between consecutive pattern features on an epipolar line, the parameter loci can be expected to not overlap, except at the true plane parameter. An example of this phenomenon is shown in the example of FIG. 4B2. This can facilitate estimation of the plane parameters even with unknown correspondences between image features and pattern features (i.e., without explicitly attempting to determine correspondences).

In the simulations and experiments described below in connection with FIGS. 7A to 10B, four pattern features were placed non-uniformly on each epipolar line such that the distance between adjacent pattern features decreased by h pixels. To reduce the likelihood of errors in epipolar line estimation, features were placed on every $k^{th}$ epipolar line on the pattern. In the simulations described below in connection with FIGS. 7A to 7B the following values were used: h=6 and k=3. In the experiments described below in connection with FIGS. 8A to 10B the following values were used: h=10 and k=6. The resulting patterns are also illustrated in Section 5 of Appendix A, which has been incorporated herein by reference. However, these are merely examples, and other parameters can be used to vary the spacing between pattern features. For example, rather than decreasing spacing by h pixels between adjacent pattern features, the distance can be increased by h pixels. As another example, other values of h and k can be used when constructing a pattern. As another example, rather than increasing or decreasing by h pixels between adjacent pattern features consistently across the entire pattern, sets of patterns on some epipolar lines can have pattern spacing that increases (e.g., by h pixels between adjacent pattern features), and sets of patterns on other epipolar lines can have pattern spacing that decreases (e.g., by h pixels between adjacent pattern features). In a more particular example, a first, third, fifth, etc. set of patterns can increase in spacing from left to right, and a second, fourth, sixth, etc. set of patterns can decrease in spacing from left to right, or vice versa. As yet another example, spacing between patterns can vary in other ways from one line to another. In a more particular example, spacing can vary based on a function (e.g., a pseudorandom function) or randomly (e.g., determined when a mask or diffractive element is being designed, determined prior to capturing each image, or at any other suitable time), rather than using a single parameter h to vary the spacing.

In some embodiments, mechanisms described herein can localize cross-shaped image features using any suitable technique or combination of techniques. For example, techniques described in Harris et al., "A combined corner and edge detector," Alvey Vision Conference, vol. 15, pp. 147-151 (1988), which is hereby incorporated by reference herein in its entirety. In a more particular example, such techniques can be applied after a thinning morphological operation (e.g., as described in Lam et al., "Thinning Methodologies—A Comprehensive Survey," IEEE Transactions on Pattern Analysis and Machine Intelligence, Vol. 14, No. 9, page 879 (1992), which is hereby incorporate herein by reference in its entirety).

In some embodiments, two camera frames can be captured in rapid succession, one with the projected pattern and one without the projected pattern. In such embodiments, mechanisms described herein can take the difference between the patterned image and the non-patterned image, which can highlight the portions of the scene on which the pattern features are projected. For example, pattern features can be recovered more reliably in scenes with strong texture and/or lighting variations by capturing a patterned and non-patterned image. However, this is merely an example, and a single image can be used for plane recovery, but it may result in less accurate estimates as the amount of texture and/or lighting variation increases.

In some embodiments, mechanisms described herein can estimate the line segments of the image feature (e.g., $u_c$ and $v_c$). For robustness against projector/camera defocus blur, mechanisms described herein can extract two edges (e.g., positive and negative gradients) from each (possibly blurred) line segment, and can compute the average of the two edges to estimate a particular line segment. These operations can be performed relatively quickly and with relatively little computational cost, because the operations have a closed-form solution. In some embodiments, mechanisms described herein can estimate an image feature $I=\{u_c, v_c, p_c\}$ from the two line segments, and the intersection point $p_c$ of the line segments.

Figure 5:
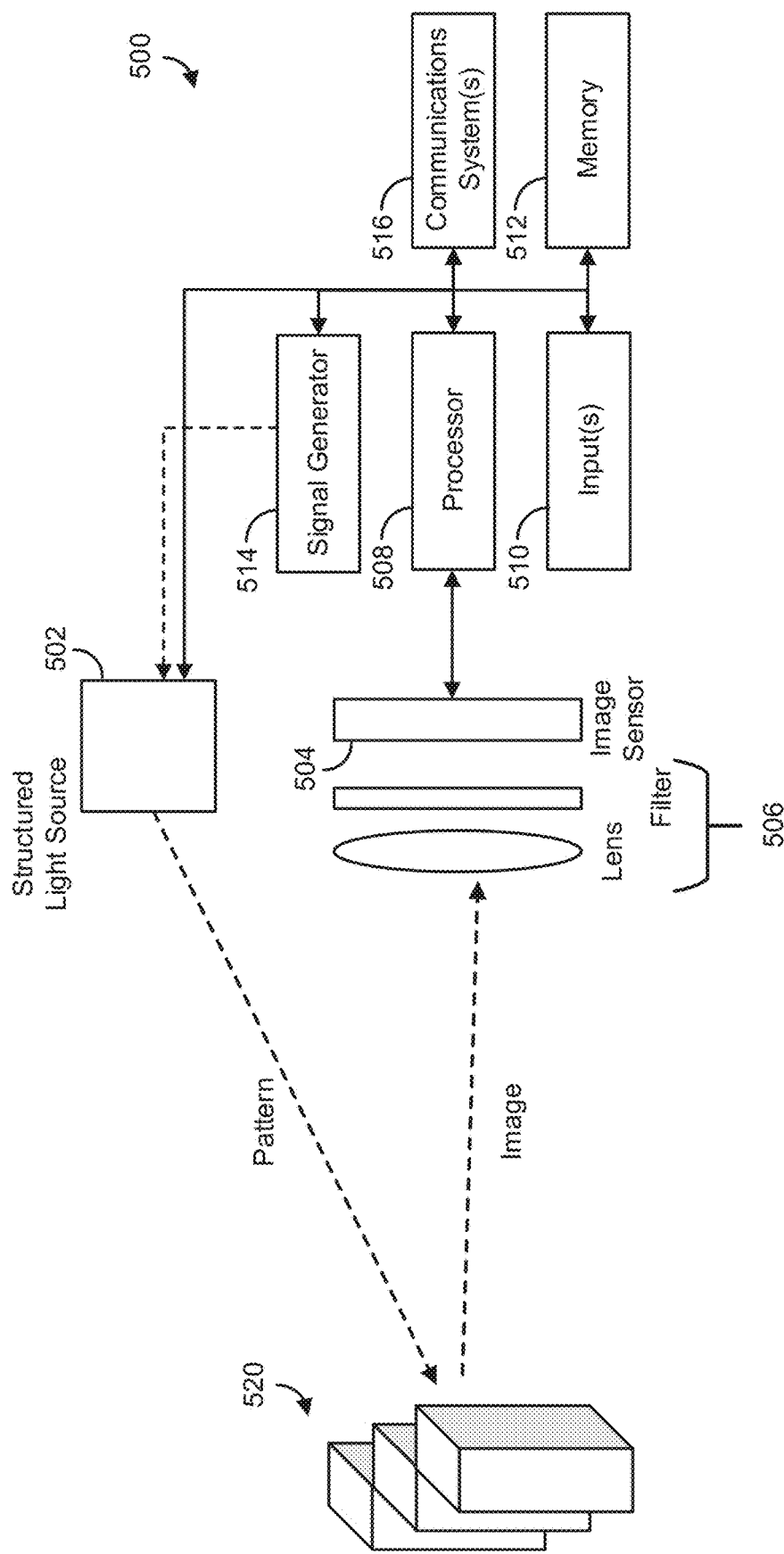
FIG. 5 shows an example of a system for directly recovering planar surfaces in a scene using structured light in accordance with some embodiments of the disclosed subject matter.

FIG. 5 shows an example of a system for directly recovering planar surfaces in a scene using structured light in accordance with some embodiments of the disclosed subject matter. As shown in FIG. 5, system 500 can include a structured light source 502; an image sensor 504; optics 506 (which can include, for example, a lens, a filter, etc.); a processor 508 for controlling operations of system 500 which can include any suitable hardware processor (e.g., a microprocessor, digital signal processor, a microcontroller, an image processor, a GPU, etc., one or more of which can be implemented using a field programmable gate array (FPGA) or an application specific integrated circuit (ASIC)) or combination of hardware processors; an input device 510 (such as a shutter button, a menu button, a microphone, a touchscreen, a etc.) for accepting input from a user and/or from the environment; memory 512; a signal generator 514 for generating one or more modulation signals for driving structured light source 502 (e.g., if light source 502 is configured to generate arbitrary patterns, rather than a single fixed pattern); and a communication system or systems 516 for allowing communication between processor 508 and other devices, such as an automated system (e.g., an automated industrial inspection system, an automated manufacturing system, an autonomous vehicle, etc.), a semi-automated system, a smartphone, a wearable computer, a tablet computer, a laptop computer, a personal computer, a game console, a server, etc., via a communication link.

In some embodiments, memory 512 can store pixel values output by image sensor 504, plane parameter loci calculated based on output from image sensor 504, etc. Memory 512 can include a storage device (e.g., a hard disk, a solid state drive, a Blu-ray disc, a Digital Video Disk (DVD), RAM, ROM, EEPROM, etc.) for storing a computer program for controlling processor 508. In some embodiments, memory 512 can include instructions for causing processor 508 to execute processes associated with the mechanisms described herein, such as processes described below in connection with FIG. 6.

In some embodiments, light source 502 can be any suitable light source that can be configured to emit patterned light toward a scene 520. In some embodiments, light source 502 can be implemented using one or more point light sources (e.g., a laser diode, an LED, etc.) and one or more masks (e.g., a transparency, a diffractive optical element, etc.). In some such embodiments, light source 502 can be configured to emit patterned light toward scene 520 using a fixed mask, a diffractive optical element, and/or any other suitable device that can cause light source 502 to produce a particular pattern upon activation. For example, light source 502 can include one or more light emitting diodes (LEDs), one or more laser diodes, one or more lamps, and/or any other suitable light source that produces light that is transmitted through the fixed mask or diffractive element and onto the scene, thereby producing a particular pattern of pattern features that are projected onto objects in the scene.

Additionally or alternatively, in some embodiments, light source 502 can be configured to emit patterned light toward scene 520 in accordance with a modulation signal (e.g., M(x)) received from signal generator 516. For example, light source 502 can include one or more light emitting diodes (LEDs), one or more laser diodes, one or more lamps, and/or any other suitable light source that can be selectively activated or otherwise modulated to produce a particular pattern specified by the modulation signal. In some embodiments, light source 502 can emit light at any suitable wavelength or combination of wavelengths. For example, light source 502 can emit visible light, near-infrared (NIR) light, etc. In some embodiments, light source 502 can be configured to emit light with a pattern that varies along multiple dimensions (e.g., to produce cross-shaped pattern features). For example, light source 502 can include (or be associated with) a spatial light modulator using one or more transmissive light crystal techniques modulation, one or more reflective liquid crystal on silicon modulation techniques, one or more digital light processing (DLP) modulation techniques (e.g., using micro mirrors that can be selectively oriented to emit light toward the scene or inhibit light from being emitted toward the scene). In some embodiments, light source 502 can include an array of light sources (e.g., LEDs, laser diodes, etc.) that can be controlled (e.g., individually addressed, addressed by column, etc.) to create a particular pattern of varying intensity across multiple dimensions of scene 520. In some embodiments, light source 502 can be implemented using a scanning laser beam that is controlled to vary intensity as it is scanned across the scene.

In some embodiments, image sensor 504 can be any suitable image sensor that can receive light reflected by scene 520, such as a CCD image sensor, a CMOS image sensor, etc.

In some embodiments, optics 506 can include optics for focusing light received from scene 520, one or more bandpass filters (e.g., narrow bandpass filters) centered around the wavelength of light emitted by light source 502, any other suitable optics, and/or any suitable combination thereof. In some embodiments, a single filter can be used for the entire area of image sensor 504 and/or multiple filters can be used that are each associated with a smaller area of image sensor 504 (e.g., with individual pixels or groups of pixels).

In some embodiments, signal generator 514 can be one or more signal generators that can generate signals to control light source 502 using a modulation signal. As described above in connection with light source 502, in some embodiments (e.g., in which a fixed mask or diffractive optical element is used), the modulation signal can be a signal that indicates whether light source 502 is to be activated or not activated (e.g., using a binary signal). Alternatively, in some embodiments (e.g., in which a projector can generate different patterns), the modulation signal can be a signal that encodes a selected pattern. Although a single signal generator is shown in FIG. 5, any suitable number of signal generators can be used in some embodiments. Additionally, in some embodiments, signal generator 514 can be implemented using any suitable number of specialized analog circuits each configured to output a signal that can be used to control a spatially varying projection of light onto a scene (e.g., scene 520).

In some embodiments, system 500 can communicate with a remote device over a network using communication system(s) 516 and a communication link. Additionally or alternatively, system 500 can be included as part of another device, such as an automated system, a semi-automated system, a security system, a smartphone, a tablet computer, a laptop computer, etc. Parts of system 500 can be shared with a device within which system 500 is integrated. For example, if system 500 is integrated with an automated industrial inspection system, processor 508 can be a processor of the automated system and can be used to control operation of system 500.

In some embodiments, system 500 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as an automated system, a semi-automated system, a digital camera, a security camera, an outdoor monitoring system, a smartphone, a wearable computer, a tablet computer, a personal data assistant (PDA), a personal computer, a laptop computer, a multimedia terminal, a game console or peripheral for a gaming counsel or any of the above devices, a special purpose device, etc.

Communications by communication system 516 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 500 and another device, such as a network link, a dial-up link, a wireless link, a hard-wired link, any other suitable communication link, or any suitable combination of such links. System 500 and/or another device (e.g., a server, a personal computer, a smartphone, etc.) can enable a user to execute a computer program that uses information derived using the mechanisms described herein to, for example, identify one or more surfaces in a scene that can be approximated as a portion of a plane.

Note that data received through the communication link or any other communication link(s) can be received from any suitable source. In some embodiments, processor 508 can send and receive data through the communication link or any other communication link(s) using, for example, a transmitter, receiver, transmitter/receiver, transceiver, or any other suitable communication device.

Figure 6:
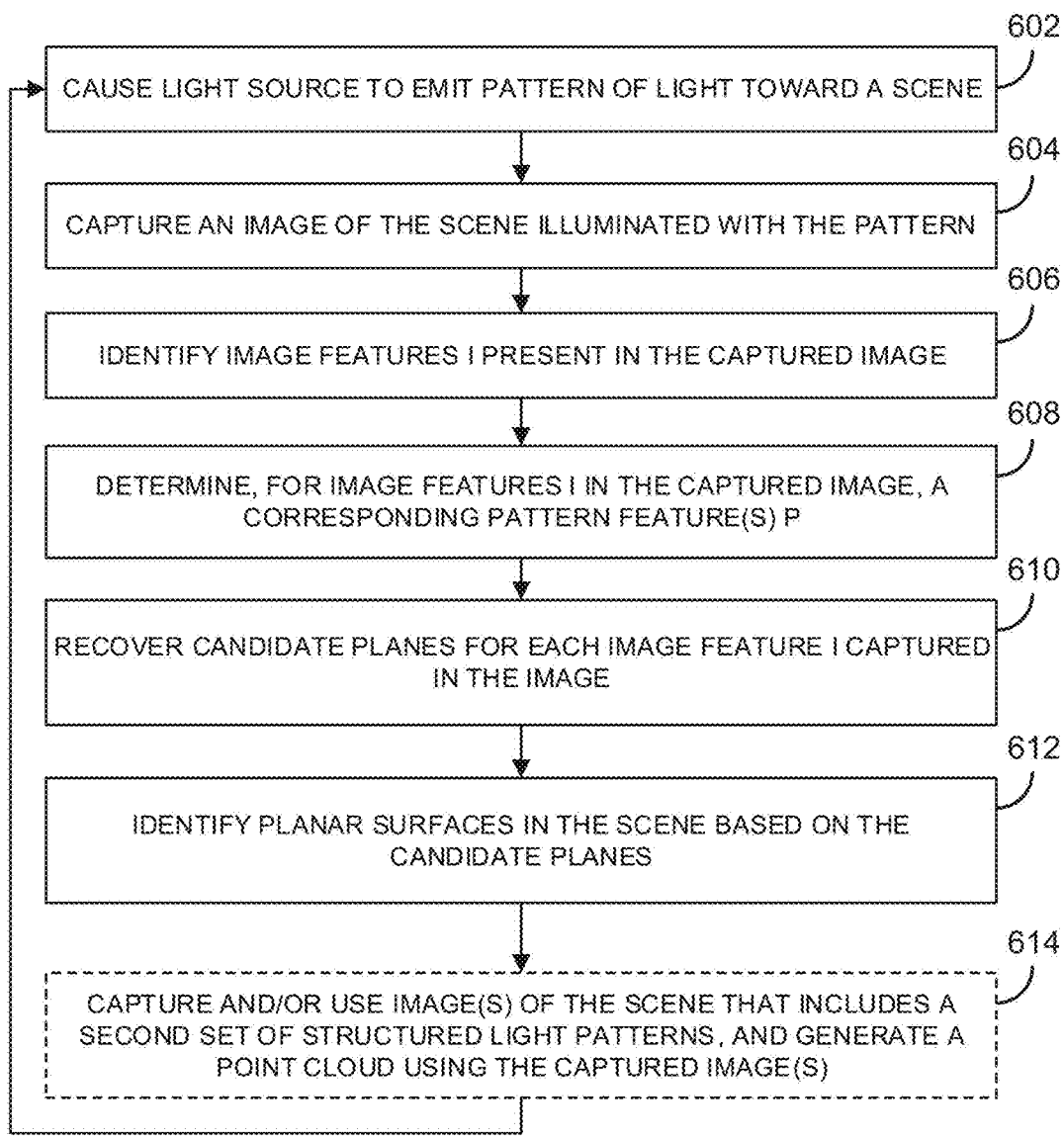
FIG. 6 shows an example of a process for directly recovering planar surfaces in a scene using structured light in accordance with some embodiments of the disclosed subject matter.

FIG. 6 shows an example of a process for directly recovering planar surfaces in a scene using structured light in accordance with some embodiments of the disclosed subject matter. At 602, process 600 can cause a light source to emit a pattern of light toward a scene. In some embodiments, process 600 can cause the light source to project any suitable pattern using any suitable technique or combination of techniques. For example, process 600 can cause the light source (e.g., light source 502) to emit light, and a mask, diffractive optical element, and/or other suitable element can cause the light to form a pattern. As another example, process 600 can cause a light source (e.g., light source 502) that is configured with a spatial light modulator to emit light in a particular pattern by causing a modulation signal that encodes the pattern to be provided to the light source (e.g., as described above in connection with light source 502 of FIG. 5).

In some embodiments, the pattern can be any suitable pattern that can be used to identify one or more candidate planes in the scene. For example, the pattern can include cross-shaped pattern features as described above in connection with FIGS. 3A to 3C, 4A1 and 4B1. In a more particular example, the cross-shaped pattern features can be distributed sparsely, such that there is at most a single pattern feature per epipolar line. As another more particular example, the cross-shaped pattern features can be distributed sparsely such that there is no more than a single set of pattern feature per epipolar line. As yet another more particular example, each set of pattern features can be distributed non-uniformly (e.g., as described above in connection with FIG. 4B1).

At 604, process 600 can cause an image sensor to capture an image of the scene illuminated with the pattern emitted at 602. In some embodiments, process 600 can cause the image sensor to capture an image using any suitable technique or combination of techniques. For example, process 600 can trigger an image capture by a CCD image sensor. As another example, process 600 can trigger an image capture by a CMOS image sensor. In some embodiments, process 600 can cause the image sensor to capture one image of the scene illuminated with the pattern emitted at 602, and one image of the scene unilluminated with the pattern emitted at 602. For example, process 600 can cause the image sensor to capture an image prior to causing the light source to emit the patter toward the scene at 602. In such embodiments, process 600 can calculate a difference between the images captured with and without illumination by the pattern, and can use the difference when identifying pattern features (e.g., as described below in connection with 606).

At 606, process 600 can identify pattern features I in the image captured at 606. In some embodiments, process 600 can identify pattern features in the captured using any suitable technique or combination of techniques. For example, for cross-shaped patterns (e.g., as described above in connection with FIGS. 3A to 3C, 4A1, and 4B1), process 600 can use a corner and/or edge detection technique. In a more particular example, process 600 can use a corner detection technique described in Harris et al., "A combined corner and edge detector," which has been incorporated by reference herein in its entirety.

In some embodiments, process 600 can determine a location within the captured image at which the pattern is located. For example, having detected a cross-shaped pattern in the captured image, process 600 can determine a pixel within the image at which two line segments forming the cross-shaped pattern intersect (e.g., a point $p_c$).

At 608, process 600 can determine a projected pattern feature P or a group of projected pattern features (e.g., $\{P_1, \ldots, P_N\}$) that corresponds to each image feature I identified in the image captured at 604. In some embodiments, process 600 can determine a corresponding pattern feature identify pattern features in the captured using any suitable technique or combination of techniques. For example, as described above in connection with FIGS. 3A to 3C, each pattern feature or set of pattern features can be associated with a particular epipolar line (e.g., a particular row for a rectified SL arrangement described above in connection with FIG. 2A). In such an example, process 600 can determine which epipolar line each image feature is associated with based on the intersection point $p_c$ of the image feature, and process 600 can identify a pattern feature or set of pattern features that is associated with that epipolar line. If an image feature intersects on an epipolar line that does not correspond to an epipolar line on which pattern features intersect, process 600 can identify a closest epipolar line on which pattern features intersect and use the pattern features associated with that epipolar line. Note that in general image features can be expected to intersect on the same epipolar line from which the pattern features are projected as this is a property of epipolar lines. However, in practice, one or more sources of error may cause the image feature to be offset from the correct epipolar line. In some embodiments, for each image feature I, process 600 can identify one or more pattern features associated with intersection points $p_p$ that fall on the same epipolar line as candidate pattern features.

At 610, process 600 can recover candidate planes for each image feature I captured in the image. In some embodiments, process 600 can recover candidate planes for image features using any suitable using any suitable technique or combination of techniques. For example, if the set of candidate pattern features are all identical, process 600 can recover a candidate plane (e.g., defined by plane parameters $\Pi=\{D, \theta, \varphi\}$) by pairing a particular image feature I with each corresponding candidate pattern feature, as described above in connection with FIGS. 4A1 to 4B2. In some embodiments, for each image feature I, process 600 can generate a plane parameter locus $\Lambda$ that can represent all candidate planes associated with that feature. As another example, if the set of candidate pattern features are not all identical and image feature I can be identified with only a subset of the candidate pattern features (e.g., if the pattern features are differentiated in some way, such as via color, line width, line angle, etc.), process 600 can recover a candidate plane by pairing a particular image feature I with each corresponding candidate pattern that is a potential match for image feature I.

At 612, process 600 can identify planar surfaces in the scene based on the candidate planes associated with each image feature. In some embodiments, process 600 can identify planar surfaces in the scene using any suitable using any suitable technique or combination of techniques. For example, as described above in connection with FIGS. 4A1 to 4B2, the location of each candidate plane parameter in the set of plane parameter loci associated with all image features can be aggregated, and the locations in Π space associated with the most candidate planes can be identified as true plane parameters for planes in the scene.

In some embodiments, process 600 can identify a set of dominant planes in the scene by aggregating the image features based on the plane parameter associated with each image feature. As described above in connection with FIGS. 4A1 to 4B2, because plane parameters can be defined with reference to the origin of a coordinate system (e.g., the CCS, the WCS, or the PCS), the plane parameters are the same for all image features that fall on that plane regardless of the distance d to any particular image feature. Accordingly, image features that fall on the same planar surface in the scene can be expected to be associated with similar plane parameters Π and can be expected to have voted for the plane parameters associated with that plane. Note that although the plane parameters in Π space appear to be spread out in a roughly rectangular shape (e.g., as shown in FIGS. 7A and 7B) this is due to the limitations of the visualization, and a single highest peak can be expected to correspond to the true planar surface in most cases.

In some embodiments, process 600 can identify local maxima (or peak) in a distribution of all candidate planes in Π space, and each local peak can be identified as a dominant plane in the scene. In such an example, process 600 can associate a particular image feature with a local peak if a candidate plane included in the plane parameter locus associated with that particular image feature corresponds to the local peak. However, due to various sources of error, candidate plane parameters for an image feature projected onto a plane in the scene may be slightly different than the true plane parameters of that plane. In some embodiments, process 600 can identify a particular image features as corresponding to a particular local peak if a candidate plane included in the plane parameter locus associated with that particular image feature is similar but not identical to the local peak. In some embodiments, process 600 can use any suitable technique or combination of techniques to identify candidate plane parameters that are sufficiently similar to the local peak to justify associating a particular image feature with that local peak. For example, process 600 can identify points associated with features that are within a circle drawn around the local peak with a predetermined radius. In such an example, process 600 can determine whether each point that falls within the circle is itself a lower local peak. Process 600 can inhibit any lower local peaks within the radius from being associated with the dominant plane, and process 600 can associate image features with candidate plane parameters within the circle with the dominant plane. In some embodiments, as the radius used for determining which image features to associate with a particular local peak increases, process 600 can expand the size of the dominant planes. However, the likelihood that image features on two surfaces with planes that are slightly offset are identified as belonging to the same dominant plane also increases as the radius increases.

In some embodiments, process 600 can identify an extent of each plane based on the image features associated with that plane. For example, process 600 can determine the convex hull of all image feature locations associated with a particular plane to identify the extent of the plane in the WCS.

In some embodiments, process 600 can calculate a depth for each point that falls on a particular plane (e.g., each pixel included within the extent of the plane) based on the plane parameters for that particular plane (e.g., as described above in connection with EQ. (5)).

At 614, process 600 can capture and/or use one or more images of the scene that include a second set of one or more structured light patterns that can be used to generate point cloud data that represents at least a portion of the scene. For example, in some embodiments, process 600 can execute 602 to 612 during a first period of time, and can execute 614 during a second period of time. This can facilitate recovery of planar features using a relatively low-cost process, while still generating a more detailed point cloud that can be used to identify and/or locate objects in the scene that are non-planar. As another example, in some embodiments, process 600 can execute 602 to 612 using a first portion of a pattern projected at 602, and can execute 614 in parallel using a second portion of the pattern projected at 602 and captured in an image at 604. In a more particular example, a second pattern can be projected simultaneously with the cross-shaped pattern features that are used in 606 to 612. Examples of single shot patterns that can be interspersed between the cross-shaped pattern features include 2D pseudorandom binary codes, and 2D random dots.

As yet another example, in some embodiments, process 600 can execute 602 to 612 using a first pattern projected at 602, and can execute 614 in parallel using a second pattern projected at 602 and captured in an image at 604. In a more particular example, two patterns can simultaneously be projected onto the scene from a single light source at different wavelengths. In such an example, a diffractive optical element or combination of diffractive optical elements can be configured to provide different patterns for different wavelengths of light, such as red and blue, red and green, blue and green, blue and NIR, etc. As more particular another example, a mask can be configured to be transparent to certain wavelengths (e.g., visible light and NIR) in certain areas corresponding to a desired projection pattern, and opaque to a subset of those wavelengths (e.g., NIR) everywhere else. Such a mask can be combined with a diffractive optical element that is configured to selectively affect light at a wavelength other than the wavelength at which the mask is opaque (e.g., a diffractive optical element that is configured to affect blue light).

In some embodiments, 614 can be omitted. For example, if a device executing process 600 only needs to identify predominant planes in the scene (e.g., to identify a suitable surface for rendering a hologram in an augmented reality scene), 614 can be omitted. As example, if a device executing process 600 has another system that can be used to generate more detailed depth information and/or that can be used to locate non-planar objects (e.g., a LiDAR-based system, a radar-based system, a machine learning-based system, etc.), 614 can be omitted.

In some embodiments, rather than utilizing a second structured light process at 614, process 600 can utilize the planar surfaces identified at 612 as constraints in a geometry-based scene recognition technique (e.g., techniques that are sometimes referred to as monocular depth estimation).

FIG. 7A shows an example of a simulated scene onto which a pattern was projected, loci corresponding to candidate planes in Π space, measured plane depths, measured plane normal, and estimated depths and plane normal recovered in accordance with some embodiments of the disclosed subject matter.

FIG. 7B shows an example of another simulated scene onto which a pattern was projected, loci corresponding to candidate planes in Π space, measured plane depths, measured plane normal, and estimated plane depths and plane normal recovered in accordance with some embodiments of the disclosed subject matter.

The results shown in FIGS. 7A and 7B are based on 3D models from an indoor dataset. The image formation process was simulated using a ray tracing tool. Plane parameters of dominant planes (e.g., labelled as a to e) for each scene were estimated in a Π space covering a range of plane depths and polar angles of plane normal defined as (0.5 meters (m)$\leq D \leq 5$ m, $0° \leq \theta \leq 9\,0°$). FIGS. 7A and 7B show the plane depths and normals computed from the plane parameters. The boundaries of planes were computed by determining the convex hull of the features assigned to the planes. As shown in FIGS. 7A and 7B, 3D scene geometry was recovered with relatively high accuracy in terms of both depths and surface normals. This can facilitate visualizing scene geometry from different camera viewpoints (even for wide baselines) as shown by in the right-most panels of FIGS. 7A and 7B. Note that although Π space is visualized in two dimensions in FIGS. 7A and 7B, this is merely to facilitate visualization in two dimensions by plotting all points using only D and θ. Mechanisms described herein can use the full 3D representation of Π space when identifying dominant planes.

FIG. 8A shows an example of a scene onto which a pattern was projected using a projector implemented in accordance with some embodiments of the disclosed subject matter.

FIG. 8B shows examples of loci corresponding to candidate planes in Π space determined based on correspondence between pattern features in the scene and pattern features on the same epipolar line of the projector estimated in accordance with some embodiments of the disclosed subject matter.

FIG. 8C shows examples of estimated plane depths determined based on the loci of FIG. 8B in accordance with some embodiments of the disclosed subject matter.

FIG. 8D shows examples of estimated plane normals determined based on the loci of FIG. 8B in accordance with some embodiments of the disclosed subject matter.

The examples shown in FIGS. 8A to 8D were generated using a SL device that included an Epson 3LCD projector, and a digital SLR camera (Canon EOS 700D). The projector-camera baseline (b in FIG. 2A) was 353 millimeters (mm). The SL device was rectified such that epipolar lines were aligned along the rows of the pattern and the captured image.

When imaging scenes with large depth variations, it is important for the mechanisms described herein to be able to recover plane parameters even for portions of a scene that are not sharply focused (e.g., portions of a scene that fall at the edge of, or outside of, the camera depth of field, and/or that fall outside of a depth of focus of the pattern projector). As described above in connection with FIGS. 4A1 to 4B2, mechanisms described herein can detect cross-shaped patterns based on an average of detected line segments for both positive and negative edges, which can provide robustness to defocus blur. Note that defocus blur can be caused by the projector, the camera, or both.

FIG. 8A shows a scene with large depth variations (0.3 m to 3 m) that includes planar objects at different distances from the camera. Π space was represented over $b \leq D \leq 3$ m and $0° \leq \theta \leq 90°$, where b is the baseline. The camera and projector were focused on the back plane (Plane a) to create a large blur on Plane d in order to demonstrate the performance over a wide range of blurs. In practice, devices implemented in accordance with the disclosed subject matter are likely to be focused in the middle of the depth range, limiting the blur size. Although the example SL device accurately identified planes with blur up to a certain size, it failed to detect a plane for very large blur sizes (e.g., plane d was not detected in the Π space). Note that blur sizes can be reduced by lowering the aperture, using extended depth-of-field approaches, and/or using laser projection devices based on diffractive elements.

Figure 9B:
FIG. 9B shows an example of loci corresponding to candidate planes in Π space determined based on the images of FIG. 9A in accordance with some embodiments of the disclosed subject matter.
Figure 9A:
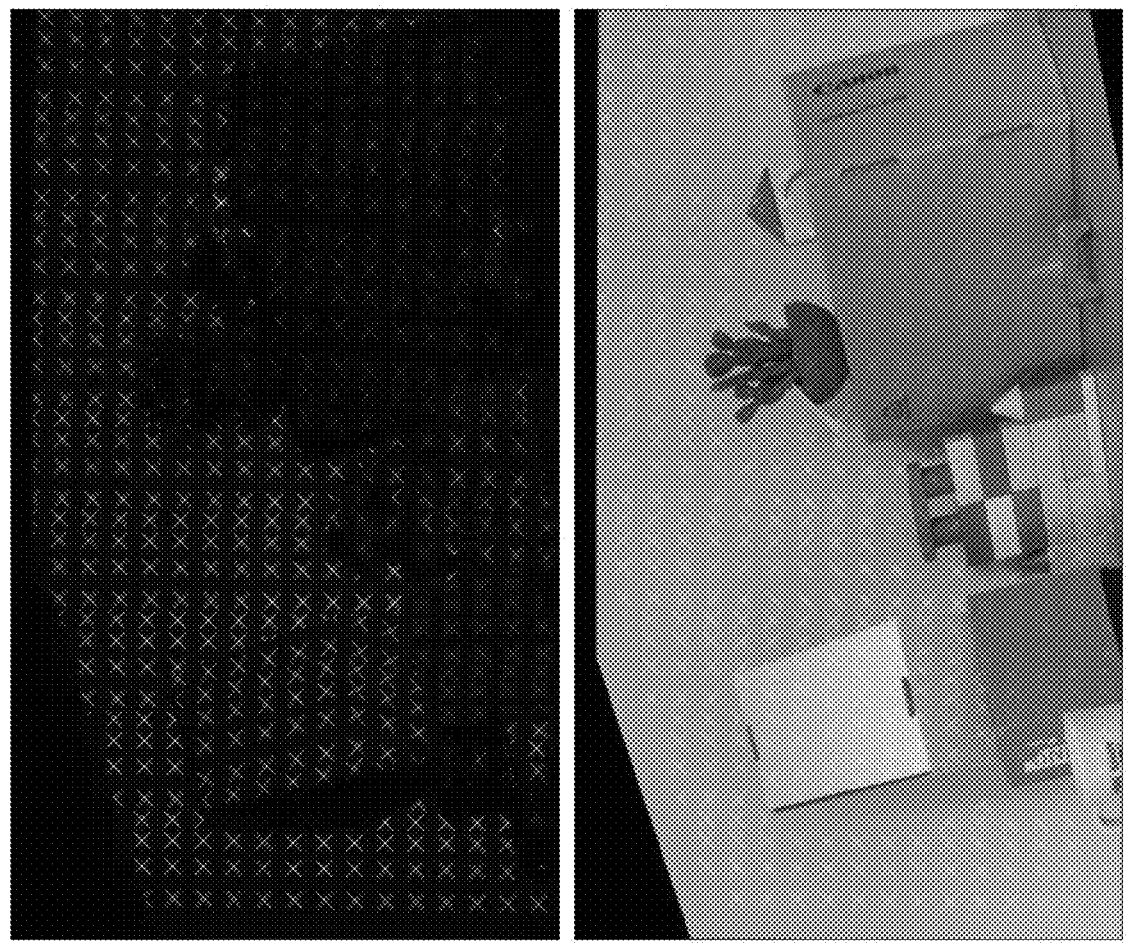
FIG. 9A shows example images of a scene onto which a pattern was projected with low levels of ambient light and the same scene onto which the pattern was projected with higher levels of ambient light captured in accordance with some embodiments of the disclosed subject matter.

FIG. 9A shows example images of a scene onto which a pattern was projected with low levels of ambient light and the same scene onto which the pattern was projected with higher levels of ambient light captured in accordance with some embodiments of the disclosed subject matter.

FIG. 9B shows an example of loci corresponding to candidate planes in Π space determined based on the images of FIG. 9A in accordance with some embodiments of the disclosed subject matter.

Figure 9D:
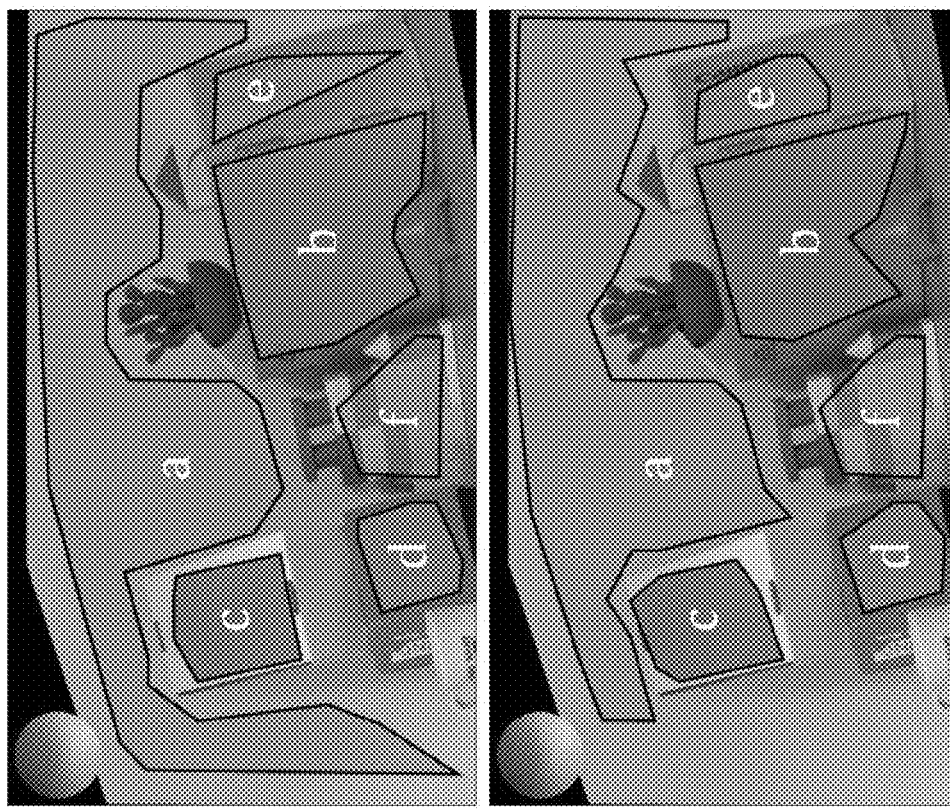
FIG. 9D shows examples of estimated plane normals determined based on the loci of FIG. 9B in accordance with some embodiments of the disclosed subject matter.
Figure 9C:
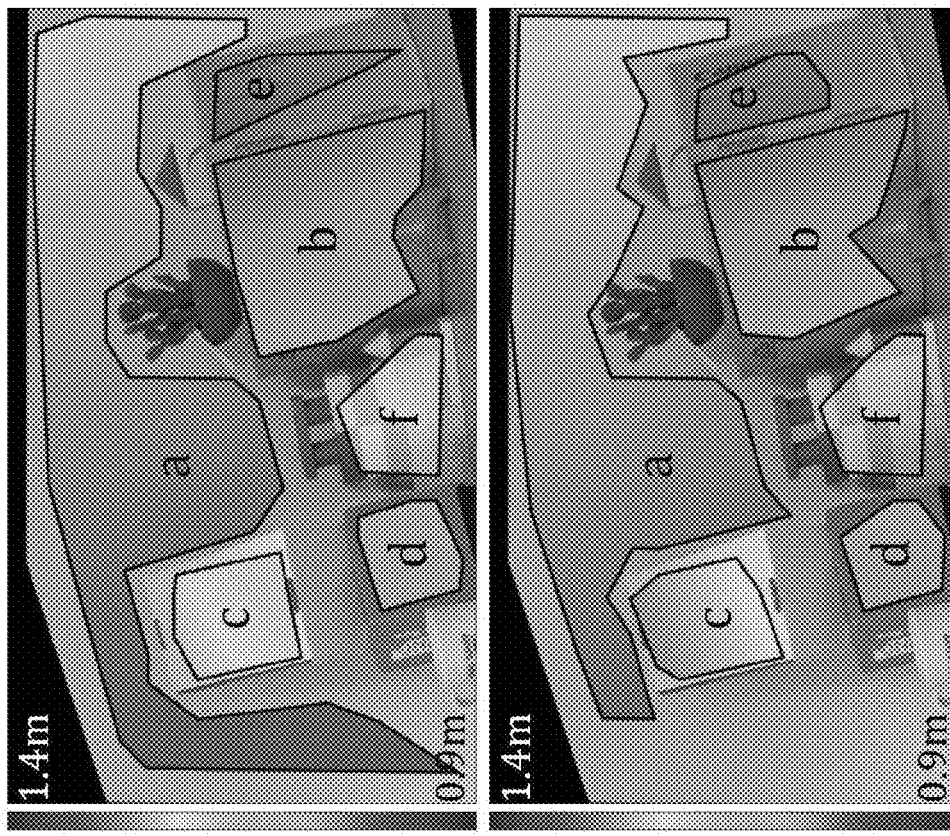
FIG. 9C shows an example of estimated plane depths determined based on the loci of FIG. 9B in accordance with some embodiments of the disclosed subject matter.

FIG. 9C shows an example of estimated plane depths determined based on the loci of FIG. 9B in accordance with some embodiments of the disclosed subject matter.

FIG. 9D shows examples of estimated plane normals determined based on the loci of FIG. 9B in accordance with some embodiments of the disclosed subject matter.

The examples shown in FIGS. 9A to 9D were generated using the same SL device used to generate the examples shown in FIGS. 8A to 8D.

Mechanisms described herein are based on shape features rather than intensity features, and accordingly are relatively robust to photometric variations (e.g., photometric calibration is not required) leading to relatively stable plane estimation under different lighting conditions. FIGS. 9A to 9D demonstrate the performance of mechanisms described herein under different ambient lighting conditions. As shown in FIGS. 9C and 9D, the example SL device generated relatively consistent results under both lighting conditions. Under extreme conditions when ambient light completely overwhelms the projected pattern, the pattern features may not be detectable in the captured image. However, this is a challenge faced by all power-limited active imaging systems in strong ambient light, and can be mitigated using narrow-band illumination, and/or spatio-temporal illumination and image coding.

Figure 10A:
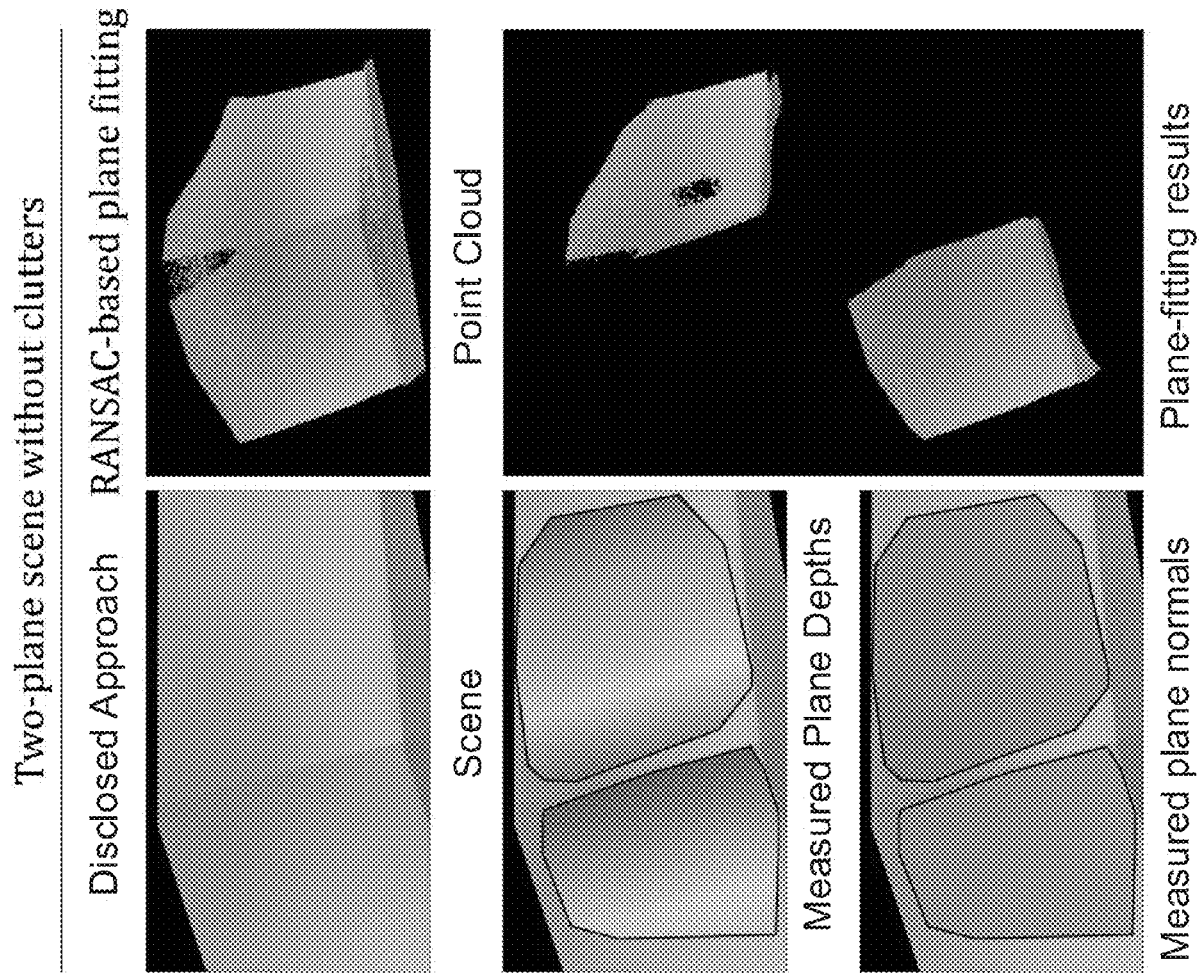
FIG. 10A shows a comparison of planes estimated from an image of a scene in accordance with some embodiments of the disclosed subject matter to planes estimated from a point cloud representation of the same scene using RANSAC-based plane fitting.

FIG. 10A shows a comparison of planes estimated from an image of a scene in accordance with some embodiments of the disclosed subject matter to planes estimated from a point cloud representation of the same scene using RANSAC-based plane fitting.

Figure 10B:
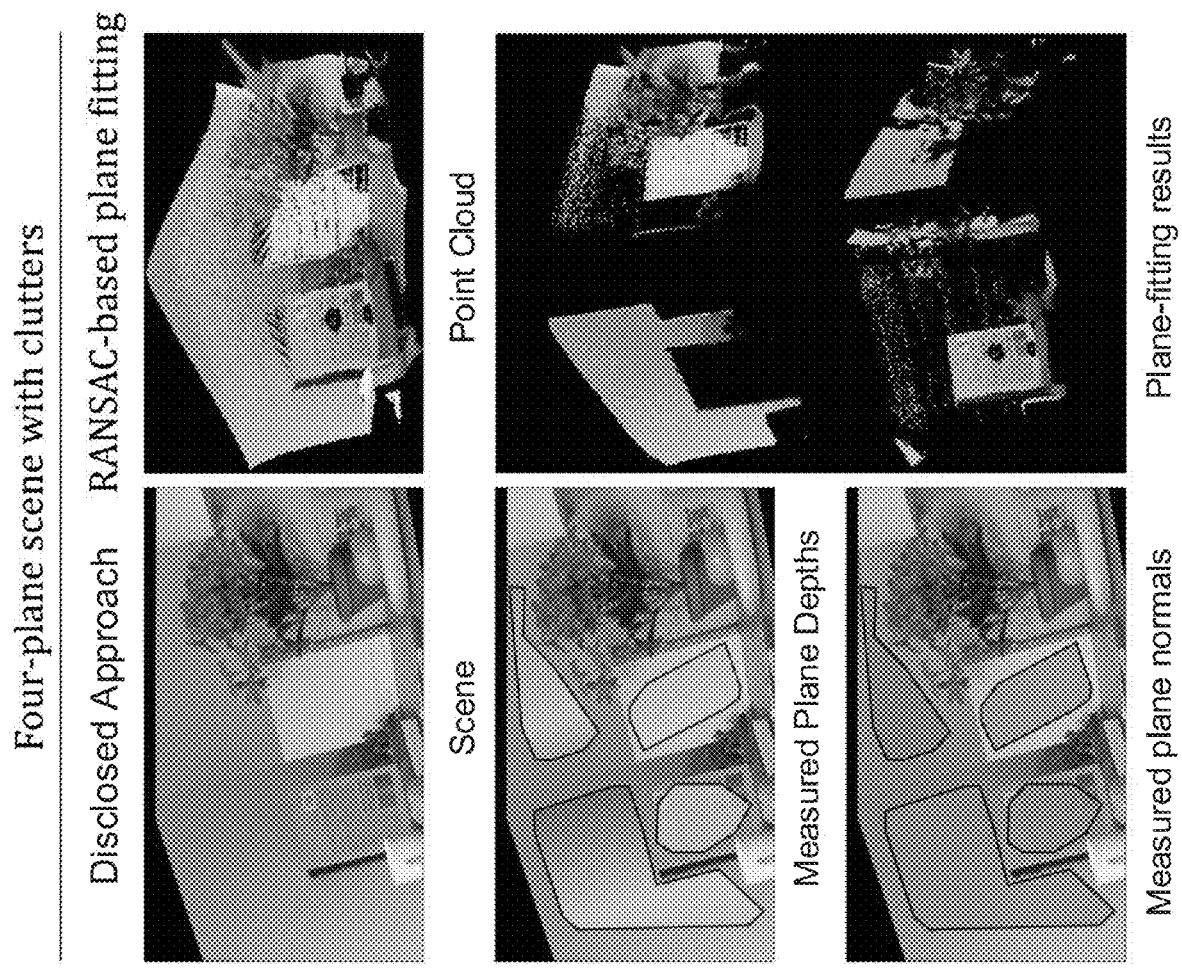
FIG. 10B shows a comparison of planes estimated from an image of a more complex scene in accordance with some embodiments of the disclosed subject matter to planes estimated from a point cloud representation of the same scene using RANSAC-based plane fitting.

FIG. 10B shows a comparison of planes estimated from an image of a more complex scene in accordance with some embodiments of the disclosed subject matter to planes estimated from a point cloud representation of the same scene using RANSAC-based plane fitting.

The examples shown on the left side of FIGS. 10A and 10B were generated using the same SL device used to generate the examples shown in FIGS. 8A to 8D, and 9A to 9D. The examples shown on the right side were generated using a conventional approach that fits planes to 3D point cloud data. The 3D point cloud data was created by a commodity depth camera (Microsoft Kinect V2). A well-optimized implementation of M-estimator SAmple Consensus (MSAC), a variant of random sample consensus (RANSAC) was used for plane fitting. To attempt to make the comparison more fair, the point cloud data was upsampled to have the same resolution of as the image captured by example SL device (3714×2182). FIGS. 10A and 10B shows two different scenes (a 2-plane scene without clutter in FIG. 10A, and a 4-plane scene with clutter in FIG. 10B). As shown in FIGS. 10A and 10B, planes fitted to the 3D point cloud included false 3D points (e.g., points that are not on the same actual scene planes) especially for the cluttered scene in FIG. 10B. Note that the RANSAC-based plane fitting results are presented in separate images with points corresponding to each identified plane being rendered in the image corresponding to that plane (e.g., in FIG. 10A the top image in the "plane-fitting results" panel includes points identified as belonging to the plane corresponding to the right wall in the scene, and the bottom image in the "plane-fitting results" panel includes points identified as belonging to the left wall in the scene). By contrast, the planes fitted using the images generated by the example SL device and using an approach implemented in accordance with mechanisms described herein produced cleaner reconstructions with correct plane assignments.

Table 1 shows a comparison of the computational complexity for the same scenes between MATLAB implementations of MSAC, and an approach implemented in accordance with mechanisms described herein, which included image feature detection and plane estimation from Π space. The RANSAC-based plane-fitting became slower as scene complexity and clutter increased. By contrast, the computational speed of the disclosed approach remained consistent regardless of the geometric complexity of the scene, and was over an order-of-magnitude faster than the RANSAC-based plane fitting. This can facilitate near real-time performance, even for high-resolution input images with an unoptimized implementation.

TABLE 1

| Scenes | RANSAC-based plane fitting | Blocks-World cameras |
|---|---|---|
| Two planes | 4.1 seconds (s) | 0.2 s |
| Four planes with clutter | 10.2 s | 0.2 s |

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the process of FIG. 6 can be executed or performed in any suitable order or sequence not limited to the order and sequence shown and described in the figures. Also, some of the above steps of the processes of FIG. 6 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for recovering planes in a scene, the system comprising:
a light source;
an image sensor comprising an array of pixels;
at least one hardware processor that is programmed to:
cause the light source to emit a two-dimensional light pattern toward the scene,
wherein the two-dimensional light pattern comprises a pattern feature that is disposed on a first epipolar line, the pattern feature comprising two intersecting line segments that intersect at a point that is located on the first epipolar line, and
wherein a first line segment of the pattern feature is angled in a range of 35° to 55° with respect to the first epipolar line, and the second line segment of the pattern feature is angled in a range of 125° to 145° with respect to the first epipolar line;
cause the image sensor to capture an image of the scene including at least a portion of the light pattern;
identify an image feature in the image, the image feature comprising two intersecting line segments that intersect at a point in the image that corresponds to the first epipolar line;
identify at least the pattern feature as potentially corresponding to the image feature based on the image feature and the pattern feature both being associated with the first epipolar line;
estimate a plane hypothesis associated with the pattern feature based on properties of the pattern feature and properties of the image feature, wherein the plane hypothesis is associated with a set of parameters that characterize a plane; and
identify a planar surface in the scene based on the plane hypothesis.

2. The system of claim 1,
wherein the two-dimensional light pattern comprises a set of N pattern features $\{P_1, \ldots, P_N\}$, including the pattern feature, that are each disposed on the first epipolar line; and
wherein the at least one hardware processor is further programmed to:
identify the set of N pattern features as potentially corresponding to the image feature based on the image feature and the set of N pattern features all being associated with the first epipolar line;
estimate a first set of N plane hypotheses each associated with a respective pattern feature of the set of N pattern features, each plane hypothesis of the first set of N plane hypotheses based on properties of the image feature and properties of the respective pattern feature,
wherein each plane hypothesis of the first set of N plane hypotheses is associated with a set of parameters that characterize a plane;
identify a second image feature in the image that is associated with the first epipolar line, the second image feature comprising two intersecting line segments that intersect at a point that corresponds to the first epipolar line;
identify the set of N pattern features as potentially corresponding to the second image feature based on the second image feature and the set of N pattern features all being associated with the first epipolar line;
estimate a second set of N plane hypotheses each associated with a respective pattern feature of the set of N pattern features, each plane hypothesis of the second set of N plane hypotheses based on properties of the second image feature and properties of the respective pattern feature,
wherein each plane hypothesis of the second set of N plane hypotheses comprises a set of parameters that characterize a plane; and
identify the planar surface in the scene based on a plane hypothesis that is a member of both the first set of N plane hypotheses and the second set of N plane hypotheses.

3. The system of claim 2, wherein N >2, and a distance along the first epipolar line between pattern feature $P_1$ and pattern feature $P_2$ is different than a distance along the first epipolar line between pattern feature $P_{N-1}$ and pattern feature $P_N$, such that the set of N pattern features $\{P_1, \ldots, P_N\}$ are non-uniformly spaced.

4. The system of claim 3, wherein the two-dimensional light pattern comprises a second set of N pattern features $\{P_{N+1}, \ldots, P_{2N}\}$ that are each disposed on a second epipolar line, and
wherein a distance along the second epipolar line between pattern feature $P_{N1}$ and pattern feature $P_{N+2}$ is different than a distance along the second epipolar line between pattern feature $P_{2N-1}$ and pattern feature $P_{2N}$, and
the distance along the second epipolar line between pattern feature $P_{N1}$ and pattern feature $P_{N+2}$ is different than a distance along the first epipolar line between pattern feature $P_1$ and pattern feature $P_2$, such that the second set of N pattern features $\{P_{N+1}, \ldots, P_{2N}\}$ are non-uniformly spaced and are spaced differently than the set of N pattern features $\{P_1, \ldots, P_N\}$.

5. The system of claim 1, wherein the at least one hardware processor is further programmed to determine that the image feature is associated with the first epipolar line based on a proximity between the point at which the two line segments intersect and the first epipolar line.

6. The system of claim 1,
wherein the light source comprises a plurality of rows, and the image sensor comprises a second plurality of rows, and
the light source and the image sensor are rectified such that each row of the plurality of rows shares an epipolar line with a row of the second plurality of rows.

7. The system of claim 1,
wherein the properties of the pattern feature comprise a first vector $u_p$ corresponding to a first line segment of the pattern feature, a second vector $v_p$ corresponding to a second line segment of the pattern feature, and coordinates $p_p$ of the point at which the first vector $u_p$ and the second vector $v_p$ intersect, and
wherein the properties of the image feature comprise a third vector $u_c$ corresponding to a first line segment of the image feature, a fourth vector $v_c$ corresponding to a second line segment of the image feature, and coordinates $p_c$ of the point at which the third vector $u_c$ and the fourth vector $v_c$ intersect.

8. The system of claim 7, wherein the set of parameters associated with the plane hypothesis define a plane Π and include a distance D corresponding to a shortest distance between an origin $c_c$ of a camera coordinate system to the plane Π, a polar angle θ between a plane normal vector n and a z axis extending through $c_c$ and a center of an image plane defined by the image sensor, and an azimuthal φ between the plane normal vector n and an x axis extending along a horizontal direction of the image plane.

9. The system of claim 8, wherein the processor is further programmed to:
determine the plane normal vector n using the relationship $$n = \frac{((p_p \times v_p) \times (p_c \times v_c)) \times ((p_p \times u_p) \times (p_c \times u_c))}{\|((p_p \times v_p) \times (p_c \times v_c)) \times ((p_p \times u_p) \times (p_c \times u_c))\|};$$

and $$D = \frac{bn^T p_p}{p_{px} - p_{cx}} - n^T c_p,$$

determine the distance D using the relationship where b is a distance between the origin $c_c$ of the camera coordinate system and an origin $c_p$ of a pattern coordinate system.

10. The system of claim 1, wherein the processor is further programmed to:
cause the image sensor to capture a second image of the scene that does not include the light pattern;
calculate a difference image based on a difference between the image and the second image; and
identify the image feature in the image using the difference image.

11. A method for recovering planes in a scene, the method comprising:
causing a light source to emit a two-dimensional light pattern toward the scene,
wherein the two-dimensional light pattern comprises a pattern feature that is disposed on a first epipolar line, the pattern feature comprising two intersecting line segments that intersect at a point that is located on the first epipolar line, and
wherein a first line segment of the pattern feature is angled in a range of 35° to 55° with respect to the first epipolar line, and the second line segment of the pattern feature is angled in a range of 125° to 145° with respect to the first epipolar line;
causing an image sensor to capture an image of the scene including at least a portion of the light pattern;
identifying an image feature in the image, the image feature comprising two intersecting line segments that intersect at a point in the image that corresponds to the first epipolar line;
identifying at least the pattern feature as potentially corresponding to the image feature based on the image feature and the pattern feature both being associated with the first epipolar line;
estimating a plane hypothesis associated with the pattern feature based on properties of the pattern feature and properties of the image feature, wherein the plane hypothesis is associated with a set of parameters that characterize a plane; and
identifying a planar surface in the scene based on the plane hypothesis.

12. The method of claim 11,
wherein the two-dimensional light pattern comprises a set of N pattern features $\{P_1, \ldots, P_N\}$, including the pattern feature, that are each disposed on the first epipolar line; and
wherein the method further comprises:
identifying the set of N pattern features as potentially corresponding to the image feature based on the image feature and the set of N pattern features all being associated with the first epipolar line;
estimating a first set of N plane hypotheses each associated with a respective pattern feature of the set of N pattern features, each plane hypothesis of the first set of N plane hypotheses based on properties of the image feature and properties of the respective pattern feature,
wherein each plane hypothesis of the first set of N plane hypotheses is associated with a set of parameters that characterize a plane;
identifying a second image feature in the image that is associated with the first epipolar line, the second image feature comprising two intersecting line segments that intersect at a point that corresponds to the first epipolar line;
identifying the set of N pattern features as potentially corresponding to the second image feature based on the second image feature and the set of N pattern features all being associated with the first epipolar line;
estimating a second set of N plane hypotheses each associated with a respective pattern feature of the set of N pattern features, each plane hypothesis of the second set of N plane hypotheses based on properties of the second image feature and properties of the respective pattern feature,
wherein each plane hypothesis of the second set of N plane hypotheses comprises a set of parameters that characterize a plane; and
identifying the planar surface in the scene based on a plane hypothesis that is a member of both the first set of N plane hypotheses and the second set of N plane hypotheses.

13. The method of claim 12, wherein N >2, and a distance along the first epipolar line between pattern feature $P_1$ and pattern feature $P_2$ is different than a distance along the first epipolar line between pattern feature $P_{N-1}$ and pattern feature $P_N$, such that the set of N pattern features $\{P_1, \ldots, P_N\}$ are non-uniformly spaced.

14. The method of claim 13, wherein the two-dimensional light pattern comprises a second set of N pattern features $\{P_{N+1}, \ldots, P_{2N}\}$ that are each disposed on a second epipolar line, and
wherein a distance along the second epipolar line between pattern feature $P_{N1}$ and pattern feature $P_{N+2}$ is different than a distance along the second epipolar line between pattern feature $P_{2N-1}$ and pattern feature $P_{2N}$, and
the distance along the second epipolar line between pattern feature $P_{N1}$ and pattern feature $P_{N+2}$ is different than a distance along the first epipolar line between pattern feature $P_1$ and pattern feature $P_2$, such that the second set of N pattern features $\{P_{N+1}, \ldots, P_{2N}\}$ are non-uniformly spaced and are spaced differently than the set of N pattern features $\{P_1, \ldots, P_N\}$.

15. The method of claim 11, wherein identifying the image feature in the image comprises determining that the image feature is associated with the first epipolar line based on a proximity between the point at which the two line segments intersect and the first epipolar line.

16. The method of claim 11,
wherein the light source comprises a plurality of rows, and the image sensor comprises a second plurality of rows, and
the light source and the image sensor are rectified such that each row of the plurality of rows shares an epipolar line with a row of the second plurality of rows.

17. The method of claim 11,
wherein the properties of the pattern feature comprise a first vector $u_p$ corresponding to a first line segment of the pattern feature, a second vector $v_p$ corresponding to a second line segment of the pattern feature, and coordinates $p_p$ of the point at which the first vector $u_p$ and the second vector $v_p$ intersect, and
wherein the properties of the image feature comprise a third vector $u_c$ corresponding to a first line segment of the image feature, a fourth vector $v_c$ corresponding to a second line segment of the image feature, and coordinates $p_c$ of the point at which the third vector $u_c$ and the fourth vector $v_c$ intersect.

18. The method of claim 17, wherein the set of parameters associated with the plane hypothesis define a plane Π and include a distance D corresponding to a shortest distance between an origin $c_c$ of a camera coordinate system to the plane Π, a polar angle θ between a plane normal vector n and a z axis extending through $c_c$ and a center of an image plane defined by the image sensor, and an azimuthal φ between the plane normal vector n and an x axis extending along a horizontal direction of the image plane.

19. The method of claim 18, further comprising:
determining the plane normal vector n using the relationship $$n = \frac{((p_p \times v_p) \times (p_c \times v_c)) \times ((p_p \times u_p) \times (p_c \times u_c))}{\|((p_p \times v_p) \times (p_c \times v_c)) \times ((p_p \times u_p) \times (p_c \times u_c))\|};$$

and $$D = \frac{bn^T p_p}{p_{px} - p_{cx}} - n^T c_p,$$

determining the distance D using the relationship where b is a distance between the origin $c_c$ of the camera coordinate system and an origin $c_p$ of a pattern coordinate system.

20. The method of claim 11, further comprising:
causing the image sensor to capture a second image of the scene that does not include the light pattern;
calculating a difference image based on a difference between the image and the second image; and
identifying the image feature in the image using the difference image.

21. A non-transitory computer readable medium containing computer executable instructions that, when executed by a processor, cause the processor to perform a method for recovering planes in a scene, the method comprising:
causing a light source to emit a two-dimensional light pattern toward the scene,
wherein the two-dimensional light pattern comprises a pattern feature that is disposed on a first epipolar line, the pattern feature comprising two intersecting line segments that intersect at a point that is located on the first epipolar line, and
wherein a first line segment of the pattern feature is angled in a range of 35° to 55° with respect to the first epipolar line, and the second line segment of the pattern feature is angled in a range of 125° to 145° with respect to the first epipolar line;
causing an image sensor to capture an image of the scene including at least a portion of the light pattern;
identifying an image feature in the image, the image feature comprising two intersecting line segments that intersect at a point in the image that corresponds to the first epipolar line;
identifying at least the pattern feature as potentially corresponding to the image feature based on the image feature and the pattern feature both being associated with the first epipolar line;
estimating a plane hypothesis associated with the pattern feature based on properties of the pattern feature and properties of the image feature, wherein the plane hypothesis is associated with a set of parameters that characterize a plane; and
identifying a planar surface in the scene based on the plane hypothesis.

22. The non-transitory computer readable medium of claim 21,
wherein the two-dimensional light pattern comprises a set of N pattern features $\{P^1, \ldots, P_N\}$, including the pattern feature, that are each disposed on the first epipolar line; and
wherein the method further comprises:
identifying the set of N pattern features as potentially corresponding to the image feature based on the image feature and the set of N pattern features all being associated with the first epipolar line;
estimating a first set of N plane hypotheses each associated with a respective pattern feature of the set of N pattern features, each plane hypothesis of the first set of N plane hypotheses based on properties of the image feature and properties of the respective pattern feature,
wherein each plane hypothesis of the first set of N plane hypotheses is associated with a set of parameters that characterize a plane;
identifying a second image feature in the image that is associated with the first epipolar line, the second image feature comprising two intersecting line segments that intersect at a point that corresponds to the first epipolar line;
identifying the set of N pattern features as potentially corresponding to the second image feature based on the second image feature and the set of N pattern features all being associated with the first epipolar line;
estimating a second set of N plane hypotheses each associated with a respective pattern feature of the set of N pattern features, each plane hypothesis of the second set of N plane hypotheses based on properties of the second image feature and properties of the respective pattern feature,
wherein each plane hypothesis of the second set of N plane hypotheses comprises a set of parameters that characterize a plane; and
identifying the planar surface in the scene based on a plane hypothesis that is a member of both the first set of N plane hypotheses and the second set of N plane hypotheses.

23. The non-transitory computer readable medium of claim 21, wherein identifying the image feature in the image comprises determining that the image feature is associated with the first epipolar line based on a proximity between the point at which the two line segments intersect and the first epipolar line.

* * * * *

UNITED STATES PATENT AND TRADEMARK OFFICE
CERTIFICATE OF CORRECTION

PATENT NO. : 11,398,085 B2
APPLICATION NO. : 16/945449
DATED : July 26, 2022
INVENTOR(S) : Mohit Gupta et al.

It is certified that error appears in the above-identified patent and that said Letters Patent is hereby corrected as shown below:

In the Specification

Column 12, Eq. (1), Line 13, "$\mathbf{u}_p=[u_{px},u_y,0]_T, \mathbf{v}_p=[v_{px},v_y,0]^T, \mathbf{p}_p=[p_{px},p_y,f]^T$" should be --$\mathbf{u}_p=[u_{px},u_y,0]^T, \mathbf{v}_p=[v_{px},v_y,0]^T, \mathbf{p}_p=[p_{px},p_y,f]^T$--.

Column 12, Eq. (2), Line 17, "$\mathbf{u}_c=[u_{cx},u_y,0]^T, \mathbf{v}_c=[v_{pc},v_y,0]_T, \mathbf{p}_c=[p_{cx},p_y,f]^T$" should be --$\mathbf{u}_c=[u_{cx},u_y,0]^T, \mathbf{v}_c=[v_{pc},v_y,0]^T, \mathbf{p}_c=[p_{cx},p_y,f]^T$--.

Column 15, Line 40, "$D_\mu=\{\underline{\mu n}|n\in\{1,\ldots,N\}\}$" should be --$D_\mu=\{\underline{\mathit{d}_{\mu n}}|n\in\{1,\ldots,N\}\}$--.

Column 23, Line 67, "9 0°" should be --90°--.

Signed and Sealed this
Eighth Day of November, 2022

Katherine Kelly Vidal
*Director of the United States Patent and Trademark Office*